United States Patent [19]
Shimada et al.

[11] Patent Number: 5,749,805
[45] Date of Patent: May 12, 1998

[54] APPARATUS FOR CONTROLLING GEAR SHIFT IN AUTOMATIC TRANSMISSION

[75] Inventors: Takamichi Shimada, Sakado; Noboru Sekine, Kasukabe, both of Japan

[73] Assignee: Honda Giken Kogyo Kabushiki Kaisha, Tokyo, Japan

[21] Appl. No.: 597,014

[22] Filed: Feb. 5, 1996

[30] Foreign Application Priority Data

Feb. 6, 1995 [JP] Japan .................................... 7-041378

[51] Int. Cl.$^6$ ...................................................... F16H 1/28
[52] U.S. Cl. ................................................ 477/116; 477/117
[58] Field of Search ............................... 477/116, 117, 477/143, 154, 155

[56] References Cited

U.S. PATENT DOCUMENTS

| | | | |
|---|---|---|---|
| 4,628,774 | 12/1986 | Iwanaga | 477/117 |
| 5,249,483 | 10/1993 | Iizuka | 477/117 |
| 5,385,511 | 1/1995 | Iiuzuka | 477/117 X |

FOREIGN PATENT DOCUMENTS

| | | | |
|---|---|---|---|
| 5-39845 | 2/1993 | Japan | 477/116 |
| 5332436 | 6/1993 | Japan . | |
| 5-180319 | 7/1993 | Japan | 477/116 |

OTHER PUBLICATIONS

English language Abstract of JP 5-332436.

*Primary Examiner*—Khoi Q. Ta
*Attorney, Agent, or Firm*—Lyon & Lyon LLP

[57] ABSTRACT

An automatic transmission includes a plurality of power transmitting gear trains making up a combination of forward power transmitting paths that can be selected one at a time, a plurality of frictional engaging elements for selecting one of the forward power transmitting paths at a time, and a one-way clutch for establishing a lowest-speed gear position among the forward power transmitting paths. When a gear shift is to be made from a neutral gear range to a forward gear range, one of the frictional engaging elements which is mechanically coupled to the one-way clutch is preliminarily engaged. When the gear shift can be made from the neutral gear range to the forward gear range, one of the frictional engaging elements for establishing the starting gear position starts being engaged, and thereafter those frictional engaging elements which are not necessary to establish the starting gear position are released. Because the frictional engaging element is mechanically coupled to the one-way clutch is preliminarily engaged, vibrations produced upon rotation of the one-way clutch are reliably suppressed when the gear shift is made from the neutral gear range to the forward gear range.

21 Claims, 16 Drawing Sheets

APPARATUS FOR CONTROLLING GEAR SHIFT IN AUTOMATIC TRANSMISSION

FIELD OF THE INVENTION

The present invention relates to an automatic transmission for use on a motor vehicle or the like, and more particularly to a gear shift control apparatus for controlling a gear shift from a neutral gear range to a forward gear range in an automatic transmission. Gear shift control for making a gear shift from a neutral gear range to a forward gear range in an automatic transmission will hereinafter be referred to as "gear engaging control."

BACKGROUND OF THE INVENTION

Automatic transmissions are composed of a number of gear trains which make up a combination of power transmitting paths that can be selected, one at a time, to make a gear shift when frictional engaging elements such as clutches, brakes, etc. are engaged under hydraulic pressure or the like. If a speed reduction ratio is abruptly changed by quickly changing from one power transmitting path to another for a gear shift, then the automatic transmission tends to suffer a gear shift shock. There have heretofore been made various efforts to adjust engagement of frictional engaging elements for making shock-free smooth gear shifts.

An automatic transmission is subject to different gear shift shocks when it is controlled to make gear shifts to various gear ranges. One of the gear shift shocks which is apt to be particularly problematic is produced when the gear shift lever is moved from a neutral gear range position which selects a neutral gear range to a forward gear range position which selects a forward gear range, i.e., when the automatic transmission is under gear engaging control. The gear engaging control is a control process for making a gear shift from the neutral gear range which is a load-free gear range to the forward gear range (or possibly a reverse gear range). In the gear engaging control, because an input torque applied to the automatic transmission is small, the ratio of a change in the torque transmitted by a frictional engaging element to a change in the engaging capacity of the frictional engaging element is large. Therefore, the engagement of the frictional engaging element needs to be controlled highly delicately in order to reduce any possible gear shift shock.

Various modes of gear engaging control have been proposed in the art. According to one mode of gear engaging control, for making a gear shift from a neutral gear range to a forward gear range, a higher-speed gear position is temporarily established at first, and then a low-speed gear position (starting gear position) is established. Such a control mode, which is called a squat control mode, is effective in allowing an output torque to vary smoothly upon a gear shift to a forward gear range, thus reducing a gear shift shock in the gear engaging control.

One apparatus for controlling an automatic transmission under gear engaging control is disclosed in Japanese laid-open patent publication No. 5-332436. According to the disclosed apparatus, when a gear shift is to be made from a neutral gear range to a forward gear range, a frictional engaging element which does not transmit a torque from an input shaft to a gear train is engaged at first, then a frictional engaging element which establishes a higher-speed gear position is engaged and a frictional engaging element which establishes a low-speed gear position is engaged, after which a frictional engaging element to be released to establish the low-speed gear position is released. Through the above control process, the disclosed apparatus controls the gear shift smoothly under gear engaging control.

While the gear shift is being made in the above conventional control process and apparatus, one-way clutches of the transmission mechanism and planetary pinions of planetary gear trains thereof tend to vibrate upon rotation. Though such vibrations are small, they are transmitted to the gear shift lever, which is then caused to vibrate. The vibration of the gear shift lever is felt by the driver who grips the gear shift lever, and makes the driver uncomfortable.

SUMMARY OF THE INVENTION

It is therefore an object of the present invention to provide a gear shift control apparatus for controlling an automatic transmission to effect a smooth gear shift under gear engaging control.

Another object of the present invention is to provide a gear shift control apparatus for controlling an automatic transmission to effectively suppress vibrations upon rotation of one-way clutches and planetary pinions for making a smooth gear shift.

To achieve the above objects, there is provided in accordance with an aspect of the present invention an apparatus for controlling a gear shift in an automatic transmission having an input member, an output member, a plurality of power transmitting gear trains disposed between the input member and the output member and making up a combination of forward power transmitting paths that can be selected one at a time, a plurality of frictional engaging elements for selecting one of the forward power transmitting paths at a time, and a one-way clutch for establishing a starting gear position among the forward power transmitting paths. The frictional engaging elements are controllable for engagement and disengagement to establish at least a forward gear range composed of forward gear positions and a neutral gear range for cutting off power transmission between the input member and the output member. The apparatus comprises gear engaging control detecting means for detecting a gear shift to be made from the neutral gear range to the forward gear range, and gear shift control means responsive to an output signal from the gear engaging control detecting means; for preliminarily engaging one of the frictional engaging elements which connects to the one-way clutch, and starting engaging one of the frictional engaging elements for establishing the starting gear position and thereafter releasing those frictional engaging elements which are not necessary to establish the starting gear position when the gear shift can be made from the neutral gear range to the forward gear range.

Since the frictional engaging element which connects to the one-way clutch is preliminarily engaged, any vibrations upon rotation of the one-way clutch are reliably suppressed in gear engaging control.

When the gear shift can be made from the neutral gear range to the forward gear range, it is preferable to preliminarily engage, for a predetermined period of time, the frictional engaging element which is used to establish the starting gear position and which is disposed parallel to the one-way clutch for applying engine braking, and thereafter to release the frictional engaging element. This makes it possible to reduce vibrations upon rotation of the one-way clutch after the frictional engaging element which can engage the one-way clutch is released from preliminary engagement until the gear shift from the neutral gear range to the forward gear range is completed.

According to another aspect of the present invention, there is also provided an apparatus for controlling a gear shift in an automatic transmission having an input member, an output member, a plurality of power transmitting planetary gear trains disposed between the input member and the output member and making up a combination of forward power transmitting paths that can be selected one at a time, and a plurality of frictional engaging elements for selecting one of the forward power transmitting paths at a time. The frictional engaging elements are controllable for engagement and disengagement to establish at least a forward gear range composed of forward gear positions and a neutral gear range for cutting off power transmission between the input member and the output member. The apparatus comprises gear engaging control detecting means for detecting a gear shift to be made from the neutral gear range to the forward gear range, and gear shift control means responsive to an output signal from the gear engaging control detecting means, for preliminarily engaging one of the frictional engaging elements which is mechanically coupled to a carrier positioned out of one of the forward power transmitting paths for establishing a forward starting gear position, and starting engaging one of the frictional engaging elements for establishing the starting gear position and thereafter releasing those frictional engaging elements which are not necessary to establish the starting gear position when the gear shift can be made from the neutral gear range to the forward gear range.

Under gear engaging control, inasmuch as a planetary carrier positioned out of the power transmitting path is held against rotation by preliminary engagement of the frictional engaging element, vibrations upon rotation of the planetary pinion supported by the planetary carrier are reliably suppressed.

If the automatic transmission has a one-way clutch used for establishing the starting gear position, then it is preferable to preliminarily engage the frictional engaging element which connects to the one-way clutch when the gear shift is detected from the neutral gear range to the forward gear range. In this manner, vibrations upon rotation of the one-way clutch can simultaneously be suppressed.

According to still another aspect of the present invention, there is also provided an apparatus for controlling a gear shift in an automatic transmission having an input member, an output member, a plurality of power transmitting gear trains disposed between the input member and the output member and making up a combination of forward power transmitting paths that can be selected one at a time, a plurality of frictional engaging elements for selecting one of the forward power transmitting paths at a time, and a one-way clutch for establishing a starting gear position among the forward power transmitting paths. The frictional engaging elements are controllable for engagement and disengagement to establish at least a forward gear range composed of forward gear positions and a neutral gear range for cutting off power transmission between the input member and the output member. The apparatus comprises gear engaging control detecting means for detecting a gear shift to be made from the neutral gear range to the forward gear range, and gear shift control means responsive to an output signal from the gear engaging control detecting means, for preliminarily engaging one of the frictional engaging elements which can engage the one-way clutch, and starting engaging one of the frictional engaging elements for establishing the starting gear position and, after elapse of a predetermined period of time, releasing those frictional engaging elements which are not necessary to establish the starting gear position.

The gear shift control means may engage and release the frictional engaging elements at times which are determined either by a timer or based on an input/output rotational speed ratio in one of the frictional engaging elements for establishing the starting gear position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

First Embodiment

Figure 1:
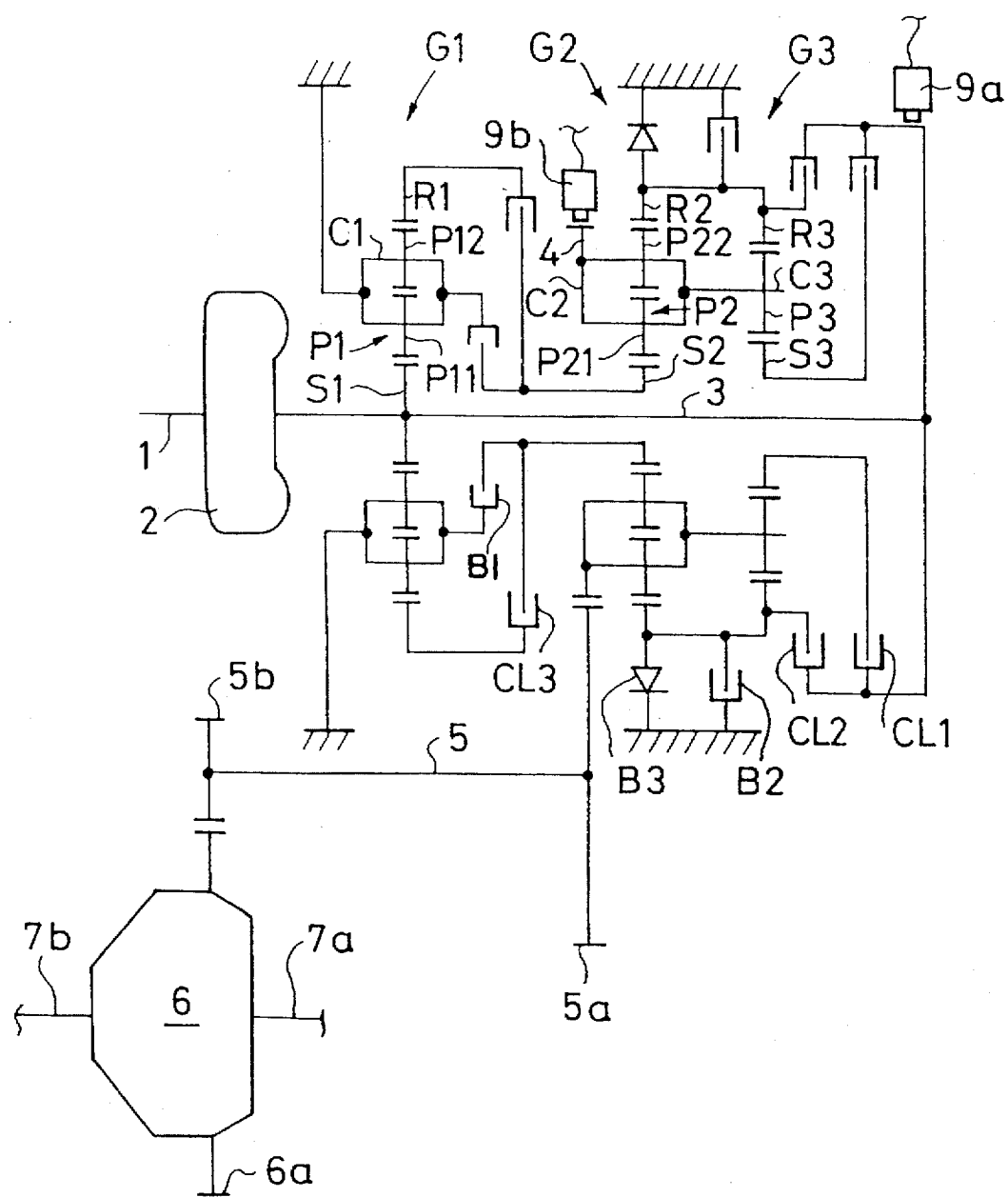
FIG. 1 is a schematic diagram of an automatic transmission which is controlled to make a gear shift by a gear shift control apparatus according to the present invention.

As shown in FIG. 1, an automatic transmission which is controlled to make a gear shift by a gear shift control apparatus according to the present invention is typically mounted on an automobile, and comprises a torque converter 2 connected to an engine output shaft 1, a transmission input shaft 3 connected to a turbine shaft of the torque converter 2, and a planetary transmission mechanism mounted on the transmission input shaft 3.

The planetary transmission mechanism has first, second, and third planetary gear trains G1, G2, G3 juxtaposed on the transmission input shaft 3. The first, second, and third planetary gear trains G1, G2, G3 comprise respective first, second, and third sun gears S1, S2, S3 positioned centrally around the transmission input shaft 3, respective first, second, and third planetary pinions P1, P2, P3 held in mesh with the first, second, and third sun gears S1, S2, S3, respectively, for revolving therearound while rotating about their own axes, respective first, second, and third carriers C1, C2, C3 by which the first, second, and third planetary pinions P1, P2, P3 are rotatably supported, for rotation in unison with the revolution of the first, second, and third planetary pinions P1, P2, P3, and respective first, second, and third ring gears R1, R2, R3 having respective internal gears held in mesh with the first, second, and third planetary pinions P1, P2, P3, respectively.

Each of the first and second planetary gear trains G1, G2 comprises a double-pinion planetary gear train. The first pinion P1 comprises two pinions P11, P12, and the second pinion P2 comprises two pinions P21, P22.

The first sun gear S1 is connected to the transmission input shaft 3 at all times. The first carrier C1, which can be braked or held against rotation by a first brake B1, is connected to the second sun gear S2 at all times. The first ring gear R1 is disengageably connected to the first carrier C1 and the second sun gear S2 by a third clutch CL3. The second carrier C2 and the third carrier C3 are connected to each other at all times, and to an output gear 4 at all times. The second ring gear R2 and the third ring gear R3 are connected to each other at all times, and can be braked or held against rotation by a second brake B2. The second ring gear R2 and the third ring gear R3 are connected to a transmission case by a one-way clutch B3 such that the second ring gear R2 and the third ring gear R3 can be braked against rotation only in a forward drive direction. The second ring gear R2 and the third ring gear R3 are disengageably connected to the transmission input shaft 3 by a second clutch CL2. The third sun gear S3 is disengageably connected to the transmission input shaft 3 by a first clutch CL1.

The automatic transmission also has an input rotation sensor 9a positioned near the first and second clutches CL1, CL2 for detecting a rotational speed of the transmission input shaft 3, and an output rotation sensor 9b positioned near the output gear 4 for detecting a rotational speed thereof.

Gear positions can be established and gear shifts can be controlled by engaging and disengaging the first, second, and third clutches CL1, CL2, CL3 and the first and second brakes B1, B2. Specifically, five forward gear positions (1ST, 2ND, 3RD, 4TH, and 5TH) and a reverse gear position (REV) can be established by engaging and disengaging the first, second, and third clutches CL1, CL2, CL3 and the first and second brakes B1, B2 as shown in Table 1 below.

TABLE 1

| Gear Position | CL1 | CL2 | CL3 | B1 | B2 |
|---|---|---|---|---|---|
| 1ST | O | | | | (O) |
| 2ND | O | | | O | |
| 3RD | O | | O | | |
| 4TH | O | O | | | |
| 5TH | | O | O | | |
| REV | | | O | | O |

In Table 1, the second brake B2 in the gear position 1ST is indicated in parentheses, meaning that the second brake B2 may not be engaged, because the gear position 1ST can be established by the one-way clutch B3 without engaging the second brake B2. Therefore, when the first clutch CL1 is engaged, the gear position 1ST can be established without the second brake B2 being engaged. However, since the one-way clutch B3 does not allow power to be transmitted in a direction opposite to the forward drive direction, no engine braking is available in the gear position 1ST which is established with the second brake B2 being disengaged. On the other hand, engine braking is available in the gear position 1ST which is established with the second brake B2 being engaged. In the normal gear position 1ST in a forward gear range (range D), no engine braking is available.

Figure 2:
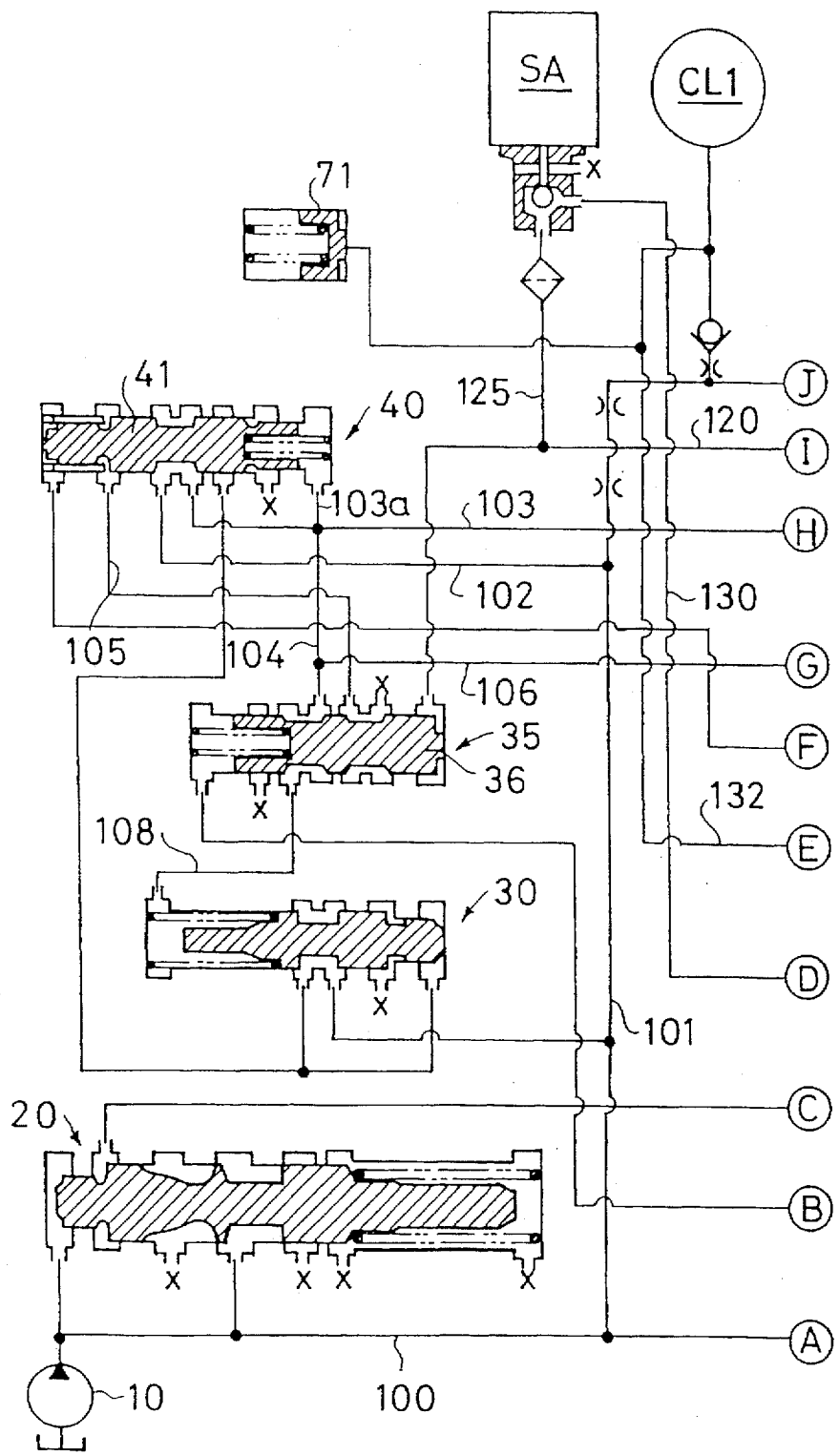
FIG. 2 is a hydraulic circuit diagram of a portion of a control system of the gear shift control apparatus according to the present invention.
Figure 3:
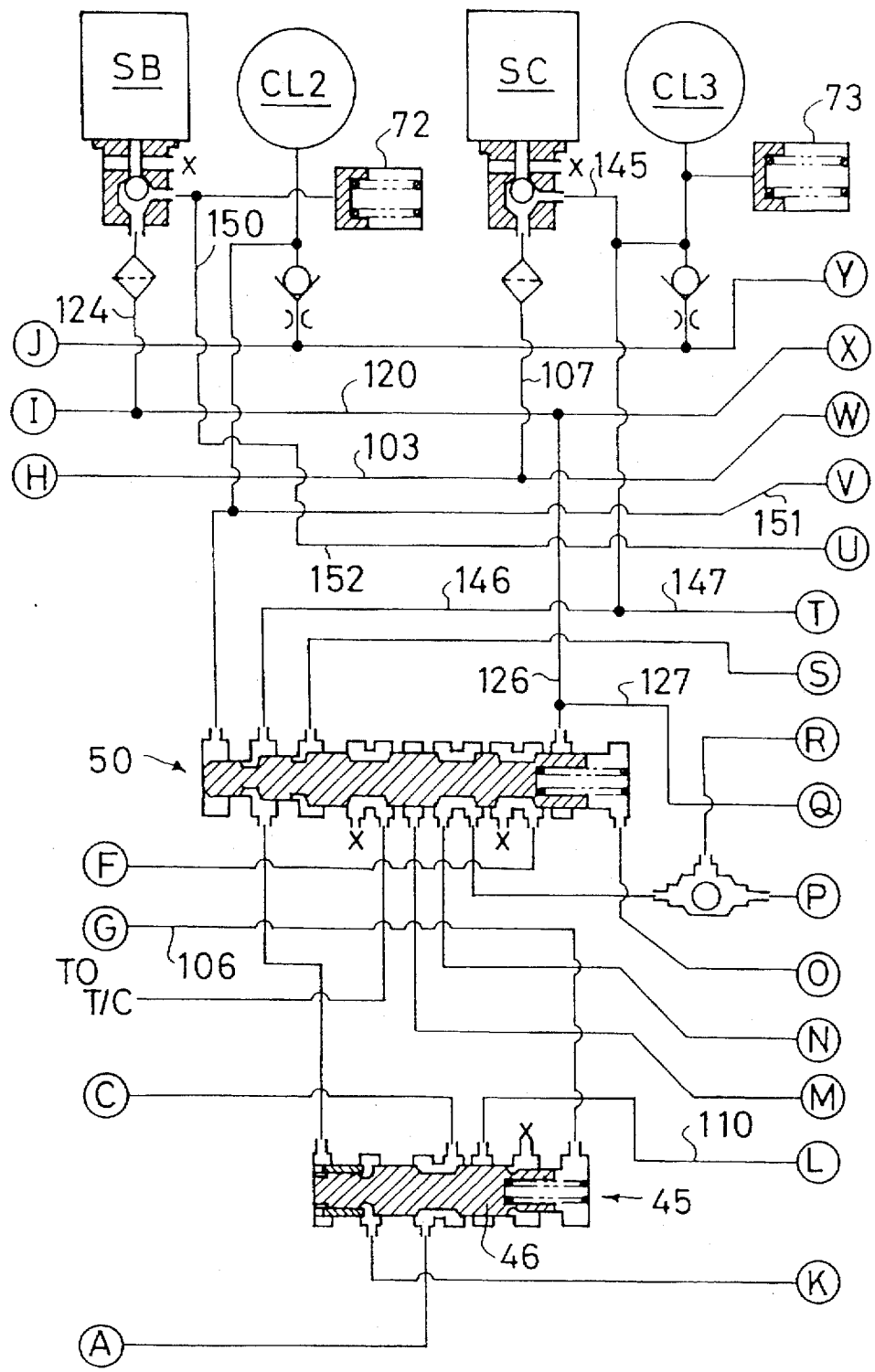
FIG. 3 is a hydraulic circuit diagram of a portion of the control system of the gear shift control apparatus according to the present invention.
Figure 4:
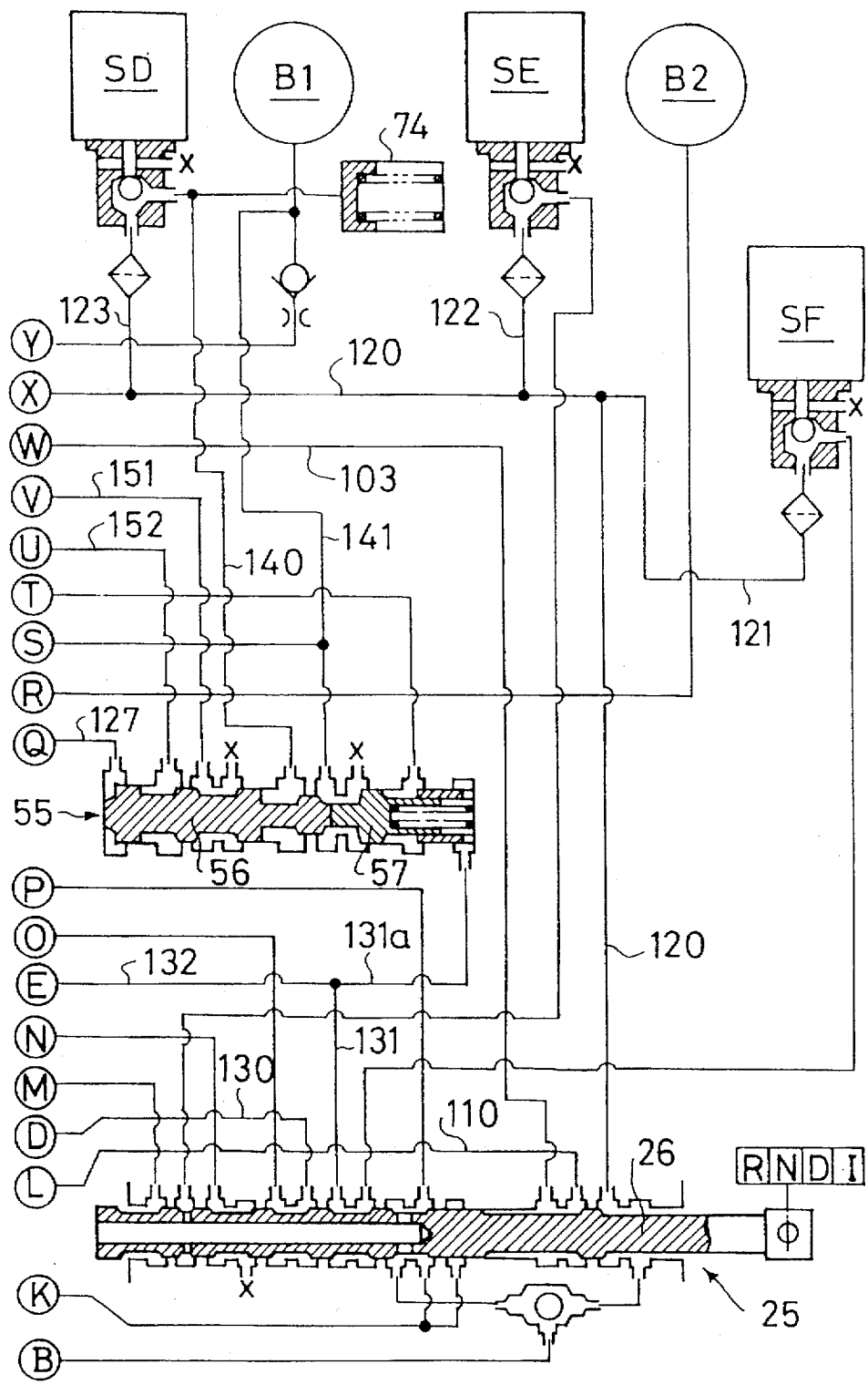
FIG. 4 is a hydraulic circuit diagram of a portion of the control system of the gear shift control apparatus according to the present invention.

A control system for controlling engagement and disengagement of the first, second, and third clutches CL1, CL2, CL3 and the first and second brakes B1, B2 will be described below with reference to FIGS. 2, 3, and 4. FIGS. 2, 3, and 4 show respective hydraulic circuit portions of the control system, and the illustrated hydraulic circuit portions make up an entire hydraulic circuit of the control system. Hydraulic passages that terminate with encircled alphabetical letters (A~Y) in each of FIGS. 2, 3, and 4 are connected to hydraulic passages that terminate with the same encircled alphabetical letters in another of FIGS. 2, 3, and 4. Hydraulic ports marked with "X" in each of FIGS. 2, 3, and 4 are drained.

The hydraulic circuit is supplied with working oil from a hydraulic pump 10 through a hydraulic passage 100 after the working oil has been regulated to a line pressure P1 by a regulator valve 20.

The hydraulic circuit has a manual valve 25 connected to the gear shift lever at the driver's seat of the automobile and manually operable by the driver seated on the driver's seat, six solenoid-operated valves SA, SB, SC, SD, SE, SF, six hydraulically operated valves 30, 35, 40, 45, 50, 55, and four accumulators 71, 72, 73, 74. The solenoid-operated valves SA, SC, SF comprise normally-open solenoid-operated valves which are open when their solenoids are turned off, and the solenoid-operated valves SB, SD, SE comprise normally-closed solenoid-operated valves which are closed when their solenoids are turned off.

The hydraulically operated valve 30 will be referred to as a reducing valve, the hydraulically operated valve 35 as an L-H shift valve, the hydraulically operated valve 40 as a FWD pressure switching valve, the hydraulically operated valve 45 as a REV pressure switching valve, the hydraulically operated valve 50 as a delivery valve, and the hydraulically operated valve 55 as a relief valve.

Depending on the operation of the manual valve 25 and the solenoid-operated valves SA~SF, the hydraulically operated valves 30, 35, 40, 45, 50, 55 operate to control gear shifts. The relationship between the operation of the solenoid-operated valves SA~SF and the gear positions established thereby is given in Table 2 below.

TABLE 2

| Gear Position | SOLENOID-OPERATED VALVE | | | | |
|---|---|---|---|---|---|
| | SA | SB | SC | SD | SE |
| Type | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | OFF | OFF | OFF | OFF |

N/O: Normally-open; N/C: Normally-closed; and L/O: Lockup clutch.

"ON", and "OFF" in Table 2 above represent the turning on and off, respectively, of the solenoids of the solenoid-operated valves. The operation of the solenoid-operated valve SF is not shown in Table 2 because the solenoid-operated valve SF is used to increase the line pressure when the reverse gear position is established, but not used to establish a forward gear position.

A control process carried out by the control system for controlling engagement and disengagement of the first, second, and third clutches CL1, CL2, CL3 and the first and second brakes B1, B2 will be described below.

First, it is assumed that the range D (forward gear range) is selected by the gear shift lever, moving a spool 26 of the manual valve 25 to a position D. In FIG. 4, the spool 26 is shown as being in a position N. The spool 26 is moved to the position D when a hook on its right-hand end moves rightward to the position D. At this time, the working oil under the line pressure P1 is delivered into hydraulic passages 101, 102 branched from the hydraulic passages 100, and then delivered to the manual valve 25 through a spool groove in the FWD switching valve 40 and a hydraulic passage 103. The working oil is thereafter supplied through grooves in the spool 26 into hydraulic passages 110, 120. At this time, the hydraulic passage 110 is closed by the REV switching valve 45.

The working oil under the line pressure P1 supplied to the hydraulic passage 120 is then supplied to the solenoid-operated valves SF, SE, SD, SB, SA through respective branch oil passages 121, 122, 123, 124, 125. The line pressure P1 in the hydraulic passage 120 acts on the right-hand end of the L-H shift valve 35, moving a spool 36 thereof to the left. A hydraulic passage 126 branched from the hydraulic passage 120 is connected to the right-hand end of the delivery valve 50, and a hydraulic passage 127 branched from the hydraulic passage 126 is connected to the left-hand end of the relief valve 55, so that the line pressure P1 in the hydraulic passage 120 also moves spools 56, 57 of the relief valve 55 to the right.

A hydraulic passage 103a branched from the hydraulic passage 103 is connected to the right-hand end of the FWD switching valve 40, so that the line pressure P1 in the hydraulic passage 103 pushes a spool 41 of the FWD switching valve 40 to the left. A hydraulic passage 104 branched from the hydraulic passage 103 is connected to the L-H shift valve 35. The working oil under the line pressure P1 which is supplied through the hydraulic passage 104 to the L-H shift valve 35 flows through a groove in the spool 36 into a hydraulic passage 105 connected to the FWD switching valve 40, for thereby applying the line pressure P1 to a left-hand portion of the FWD switching valve 40. A hydraulic passage 106 branched from the hydraulic passage 104 is connected to the right-hand end of the REV switching valve 45, so that the line pressure P1 in the hydraulic passage 104 keeps a spool 46 of the REV switching valve 45 shifted to the left.

A hydraulic passage 107 branched from the hydraulic passage 103 is connected to the solenoid-operated valve SC for thereby supplying the line pressure P1 to the solenoid-operated valve SC.

Therefore, the line pressure P1 is supplied to the solenoid-operated valves SA~SF. The supply of the working pressure under the line pressure P1 can thus be controlled by controlling the opening and closing of the solenoid-operated valves SA~SF.

Establishing the gear position 1ST will be described below. Since the solenoid-operated valve SF is not involved in establishing forward gear positions, only the solenoid-operated valves SA~SE will be described below.

For establishing the gear position 1ST, as shown in Table 2, the solenoid of the solenoid-operated valve SC is turned on, and the solenoids of the other solenoid-operated valves are turned off. Therefore, only the solenoid-operated valve SA is opened, and the other solenoid-operated valves are closed. When the solenoid-operated valve SA is opened, the line pressure P1 is supplied from the hydraulic passage 125 to a hydraulic passage 130, from which the line pressure P1 is supplied through a groove in the manual valve spool 26 in the position D into a hydraulic passage 131.

A hydraulic passage 131a branched from the hydraulic passage 130 is connected to the right-hand end of the relief valve 55. Therefore, the line pressure P1 acts on the right-hand end of the relief valve 55. The line pressure P1 is supplied through a hydraulic passage 132 branched from the hydraulic passage 131 to the first clutch CL1, thereby engaging the first clutch CL1. A change in the hydraulic pressure supplied to the first clutch CL1 can be regulated by the first accumulator 71.

The second clutch CL2 is connected through the relief valve 55 with the spools 56, 57 shifted to the right and the solenoid-operated valve SB to the drain, and the third clutch CL3 is connected through the solenoid-operated valve SC to the drain. The first brake B1 is connected through the relief valve 55 and the solenoid-operated valve SC to the drain, and the second brake B2 is connected through the manual valve 25 to the drain. Therefore, only the first clutch CL1 is engaged, establishing the gear position 1ST.

For establishing the gear position 2ND, as shown in Table 2, the solenoid of the solenoid-operated valve SD is turned on, opening the solenoid-operated valve SD, in addition to the solenoid-operated valve SC in the gear position 1ST. The line pressure P1 is supplied from the hydraulic passage 123 to a hydraulic passage 140, and the working oil under the line pressure P1 is supplied from the relief valve 55 with the spools 56, 57 shifted to the right through a hydraulic passage 141 to the first brake B1. The first clutch CL1 and the first brake B1 are now engaged, establishing the gear position 2ND.

For establishing the gear position 3RD, as shown in Table 2, the solenoid of the solenoid-operated valve SC is turned off, and the solenoid of the solenoid-operated valve SD is also turned off. Since the solenoid-operated valve SD is closed, the first brake B1 is released. The solenoid-operated valve SC is opened, supplying the working oil under the line pressure P1 from the hydraulic passage 107 through a hydraulic passage 145 to the third clutch CL3. The third clutch CL3 is engaged, establishing the gear position 3RD.

At the same time, the line pressure P1 acts on a left-hand portion of the delivery valve 50 through a hydraulic passage 146 branched from the hydraulic passage 145, and also acts on the right-hand end of the relief valve 55 through a hydraulic passage 147 branched from the hydraulic passage 145.

For establishing the gear position 4TH, as shown in Table 2, the solenoid of the solenoid-operated valve SB is turned on, and the solenoid of the solenoid-operated valve SC is also turned on. Since the solenoid-operated valve SC is closed, the third clutch CL3 is released. The solenoid-operated valve SB is opened, supplying the line pressure P1 from the hydraulic passage 124 through hydraulic passages 150, 152 to the relief valve 55. The line pressure P1 is then supplied from a groove in the spool 56 of the relief valve 55 through a hydraulic passage 151 to the second clutch CL2. The second clutch CL2 is now engaged, establishing the gear position 4TH.

For establishing the gear position 5TH, as shown in Table 2, the solenoid of the solenoid-operated valve SA is turned on, and the solenoid of the solenoid-operated valve SC is turned off. The solenoid-operated valve SA is closed, cutting off the supply of the line pressure P1 to the hydraulic passage 130. The first clutch CL1 is connected through the solenoid-operated valve SA to the drain, and hence is released. The solenoid-operated valve SC is opened, engaging the third clutch CL3. As a result, the gear position 5TH is established.

Figure 5:
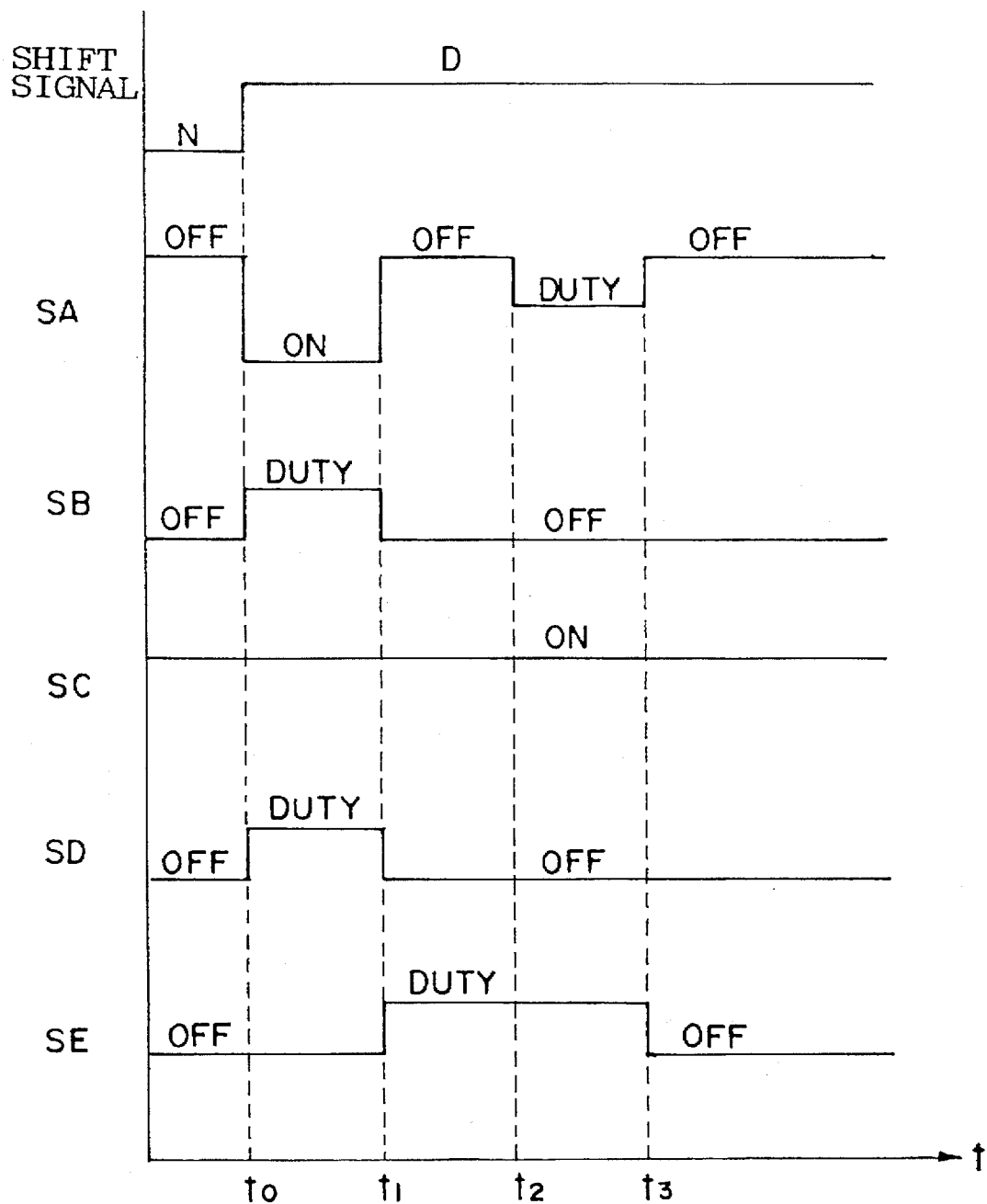
FIG. 5 is a timing chart showing a pattern of operational control of solenoid-operated valves in a gear shift control process effected by the gear shift control apparatus according to the present invention.
Figure 7:
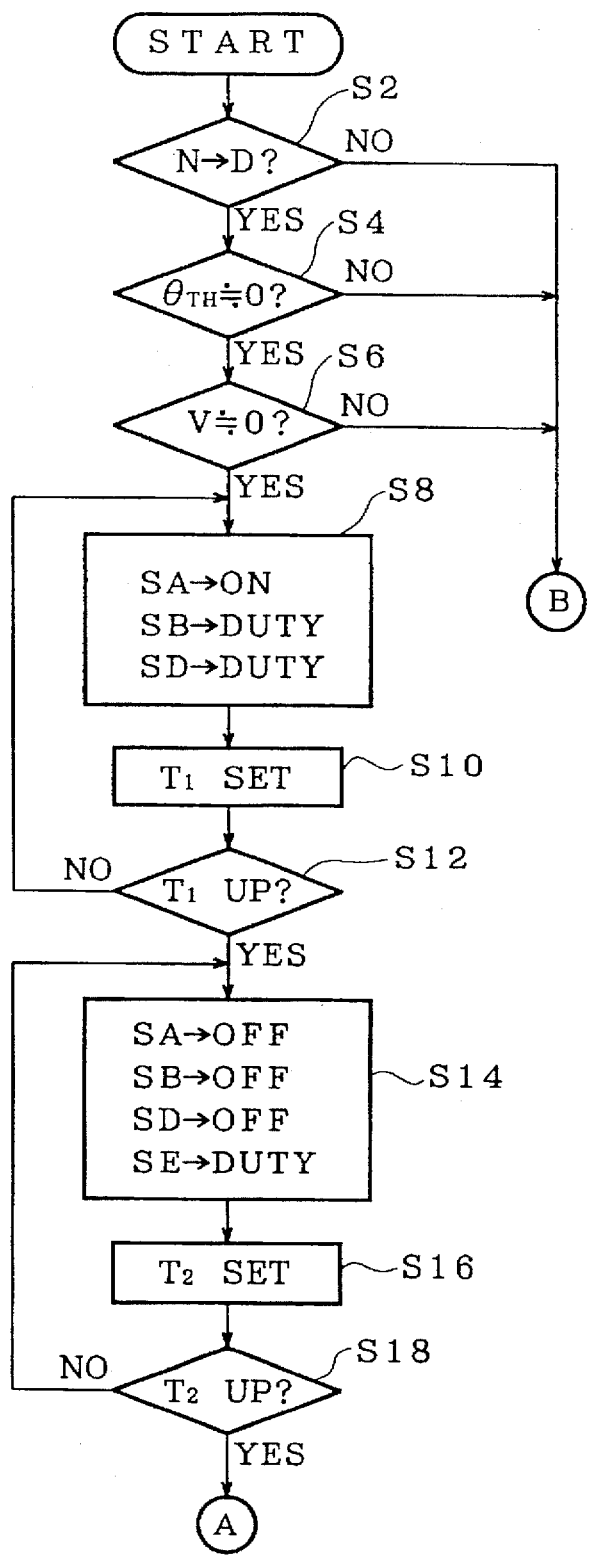
FIG. 7 is a flowchart of the gear shift control process effected by the gear shift control apparatus according to the present invention.
Figure 8:
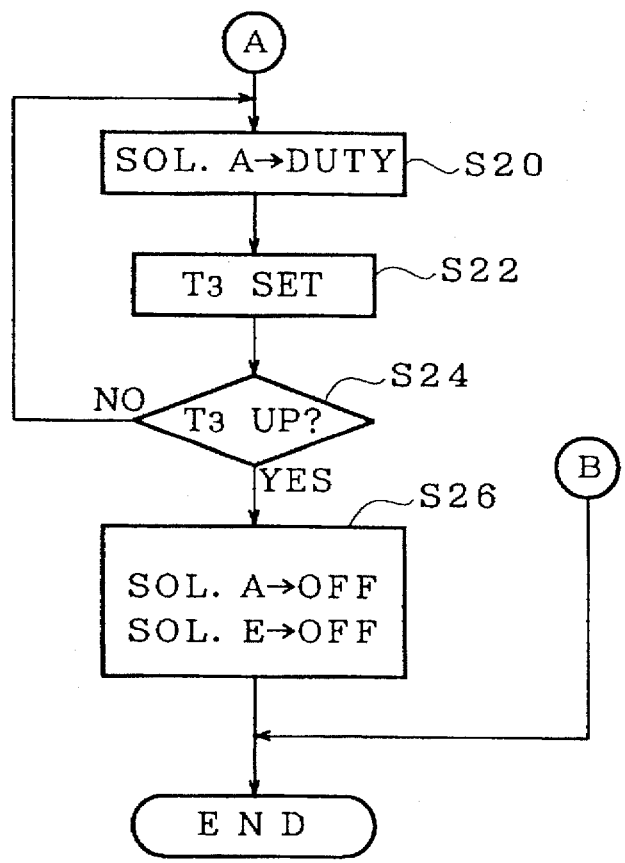
FIG. 8 is a flowchart of the gear shift control process effected by the gear shift control apparatus according to the present invention.

The first, second, and third clutches CL1, CL2, CL3 and the first and second brakes B1, B2 are controlled for their engagement and disengagement in the manner described above. Now, a control process (gear engaging control process) of controlling clutch and brake engagement and disengagement for making a gear shift from the range N (neutral gear range) to the range D (forward gear range) by moving the gear shift lever from the position N to the position D will be described below with reference to timing chart of FIGS. 5 and 6 and flowcharts of FIGS. 7 and 8. As shown in the timing chart of FIGS. 5 and 6, it is assumed that the gear shift lever is moved from the position N to the position D at a time t0.

The control system detects a gear shift from the range N to the range D in a step S2. If there is a gear shift from range N to the range D at the time t0, then the control system determines whether a throttle opening ΘTH of the automobile engine is substantially fully closed or not in a step S4, and then determines whether a vehicle speed V of the automobile is substantially nil or not in a step S6. If the throttle opening ΘTH is not substantially fully closed or if the vehicle speed V is not substantially nil, then the control process is not carried out.

If the gear shift from the range N to the range D is effected while the throttle opening ΘTH is substantially fully closed and also while the vehicle speed V is substantially nil, then control proceeds to a step S8 in which the control system turns on the solenoid of the solenoid-operated valve SA and controls the duty cycles of the solenoid-operated valves SB, SD. The control system turns on the solenoid of the solenoid-operated valve SA and controls the duty cycles of the solenoid-operated valves SB, SD in a first period of time T1 in steps S10, S12. When the solenoid-operated valves SA, SB, SD are thus controlled, the second clutch CL2 and the first brake B1 are supplied with low clutch-engaging hydraulic pressures corresponding to the controlled duty cycles, and are partly engaged.

When the second clutch CL2 and the first brake B1 start being partly engaged, a rotational speed NT of the transmission input shaft 3, i.e., a rotational speed of the turbine of the torque converter 2, starts being gradually lowered, and an input/output rotational speed ratio eCL starts being gradually increased. At the same time, a transmission output torque T0 starts being gradually increased, resulting in a slight change in an automobile acceleration G. In the range N, the engine is idling at a rotational speed of about 850 rpm, for example, and the rotational speed NT of the transmission input shaft 3 is of about 750 rpm, for example, since it is transmitted from the engine through the torque converter 2.

In the range N, the transmission output torque T0 is nil because the vehicle speed V is nil. Since the input/output rotational speed ratio eCL (=output shaft rotational speed/input shaft rotational speed) at the first clutch CL1 (clutch for the starting gear position) cannot be calculated with the transmission output torque T0 being nil, the transmission output torque T0 is assumed to be 10 rpm for the calculation of the input/output rotational speed ratio eCL. Therefore, immediately after the gear shift to the range D, the input/output rotational speed ratio eCL is not nil, but is of a very small value, e.g., eCL=0.13. The input/output rotational speed ratio eCL can be determined from detected values from the input rotation sensor 9a and the output rotation sensor 9b and a gear ratio.

When the above control has continued for the first period of time T1 and a time t1 has been reached in the step S12, the control system determines that it is possible to make a gear shift under gear engaging control. Control now goes to a step S14 in which the control system turns off the solenoids of the solenoid-operated valves SA, SB, SD and controls the duty cycle of the solenoid-operated valve SE. As a result, the second clutch CL2 and the first brake B1 which have been partly engaged are released, and at the same time the first clutch CL1 starts being engaged and the second brake B2 is partly engaged. The rotational speed NT of the transmission input shaft 3 is continuously lowered, and the input/output rotational speed ratio eCL and the transmission output torque T0 are continuously increased.

Figure 6:
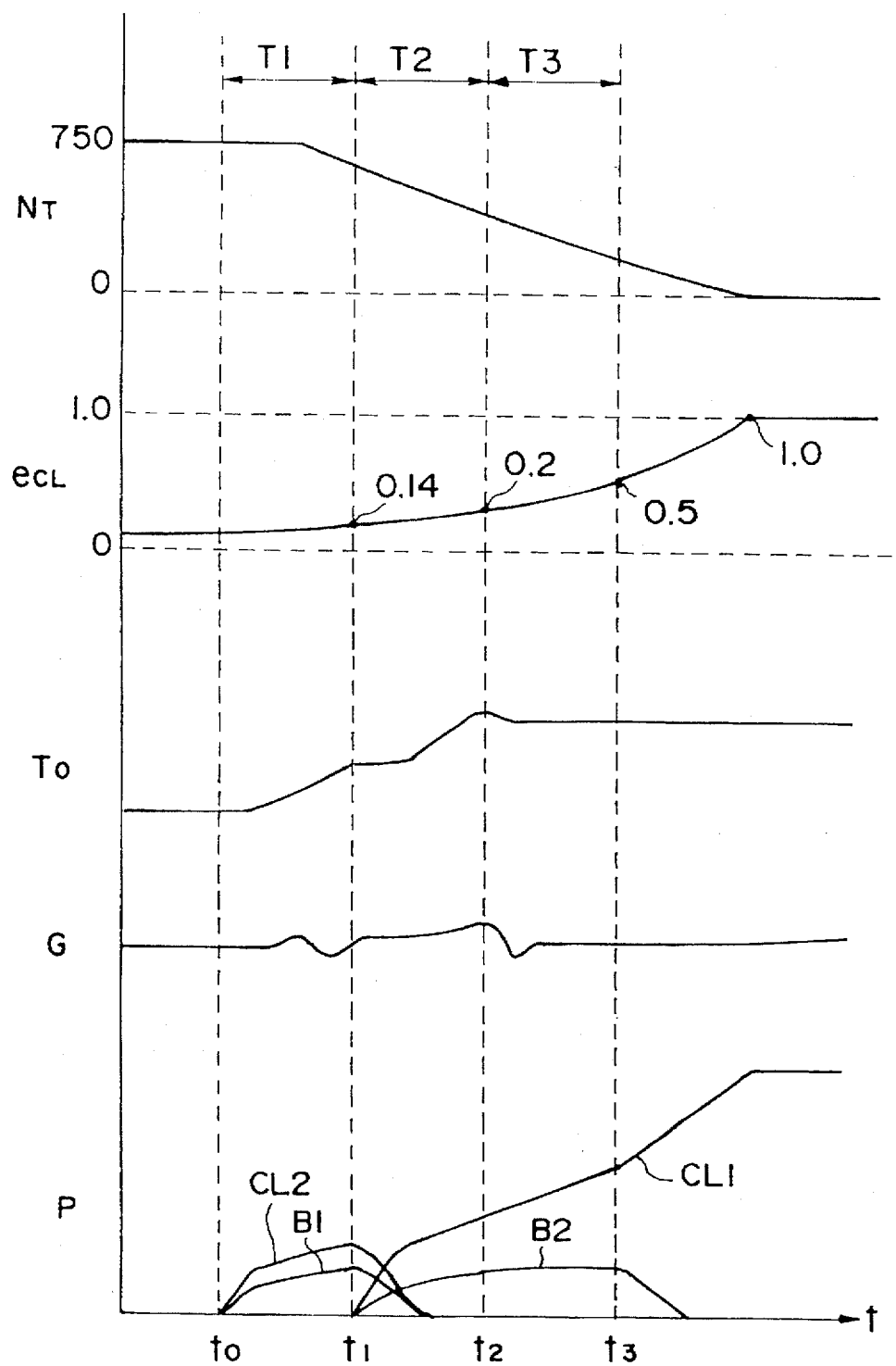
FIG. 6 is a timing chart showing how various variables vary with time in the gear shift control process effected by the gear shift control apparatus according to the present invention.

When the above control has continued for a second period of time T2 in steps S16, S18, the control system switches to controlling the duty cycle of the solenoid-operated valve SA at a time t2 in a step S20. During this time, the control of the duty cycle of the solenoid-operated valve SE is continued to keep the second brake B2 partly engaged. The control of the duty cycle of the solenoid-operated valve SA serves to gradually engage the first clutch CL1, and the hydraulic pressure supplied to the first clutch CL1 is increased as shown in FIG. 6.

After elapse of a third period of time T3 in steps S22, S24, the control system switches to controlling the duty cycles of the solenoid-operated valves SA, SE at a time t3 in a step S26. As a consequence, the hydraulic pressure supplied to the first clutch CL1 is increased to the line pressure at a given rate through the action of the accumulator 20 until the first clutch CL1 is fully engaged to establish the gear position 1ST (starting gear position). The second brake B2 which has been partly engaged is released, whereupon the gear shift from the range N to the range D is completed.

In the gear engaging control, as described above, the second clutch CL2 and the first brake B1 are partly engaged, and at the same time that they are released, the first clutch CL1 starts being engaged and the second brake B2 is partly engaged. The second clutch CL2 which is partly engaged is mechanically coupled to the one-way clutch B3, and the second brake B2 is also mechanically coupled to the one-way clutch B3. During the gear engaging control, therefore, any vibrations produced upon rotation of the one-way clutch B3 are suppressed by the partly engaged second clutch CL2.

The first brake B1 which is partly engaged is mechanically coupled to the first carrier C1 of the first planetary gear train G1 for thereby suppressing vibrations upon rotation of the first carrier C1 in the gear engaging control. In the gear position 1ST, the torque from the input shaft 3 is transmitted from the first clutch CL1 through the third sun gear S3, the third carrier C3, and the second carrier C2 to the output gear 4. Though the first carrier C1 is highly likely to vibrate upon rotation because the first carrier C1 is positioned out of the power transmitting path in the gear position 1ST, such vibrations of the first carrier C1 are effectively reduced by the partly engaged first brake B1. Consequently, the gear engaging control carried out by the gear shift control apparatus according to the present invention allows a highly smooth, vibration-free gear shift to be made from the range N to the range D.

The above process of controlling clutches and brakes to be partly engaged serves only to engage clutches and brakes very lightly to suppress vibrations upon rotation thereof, and is referred to as a preliminary engagement control process.

The times t1, t2, t3 at which to effect switching the control of the solenoid-operate valves are determined by a timer. However, the control of the solenoid-operate valves may be switched depending on a change in the input/output rotational speed ratio eCL. For example, the time t1 may be determined as a time when the input/output rotational speed ratio eCL becomes 0.14, rather than when the first period of time T1 elapses, the time t2 may be determined as a time when the input/output rotational speed ratio eCL becomes 0.2, rather than when the second period of time T2 elapses, and the time t3 may be determined as a time when the input/output rotational speed ratio eCL becomes 0.5, rather than when the third period of time T3 elapses.

Figure 9:
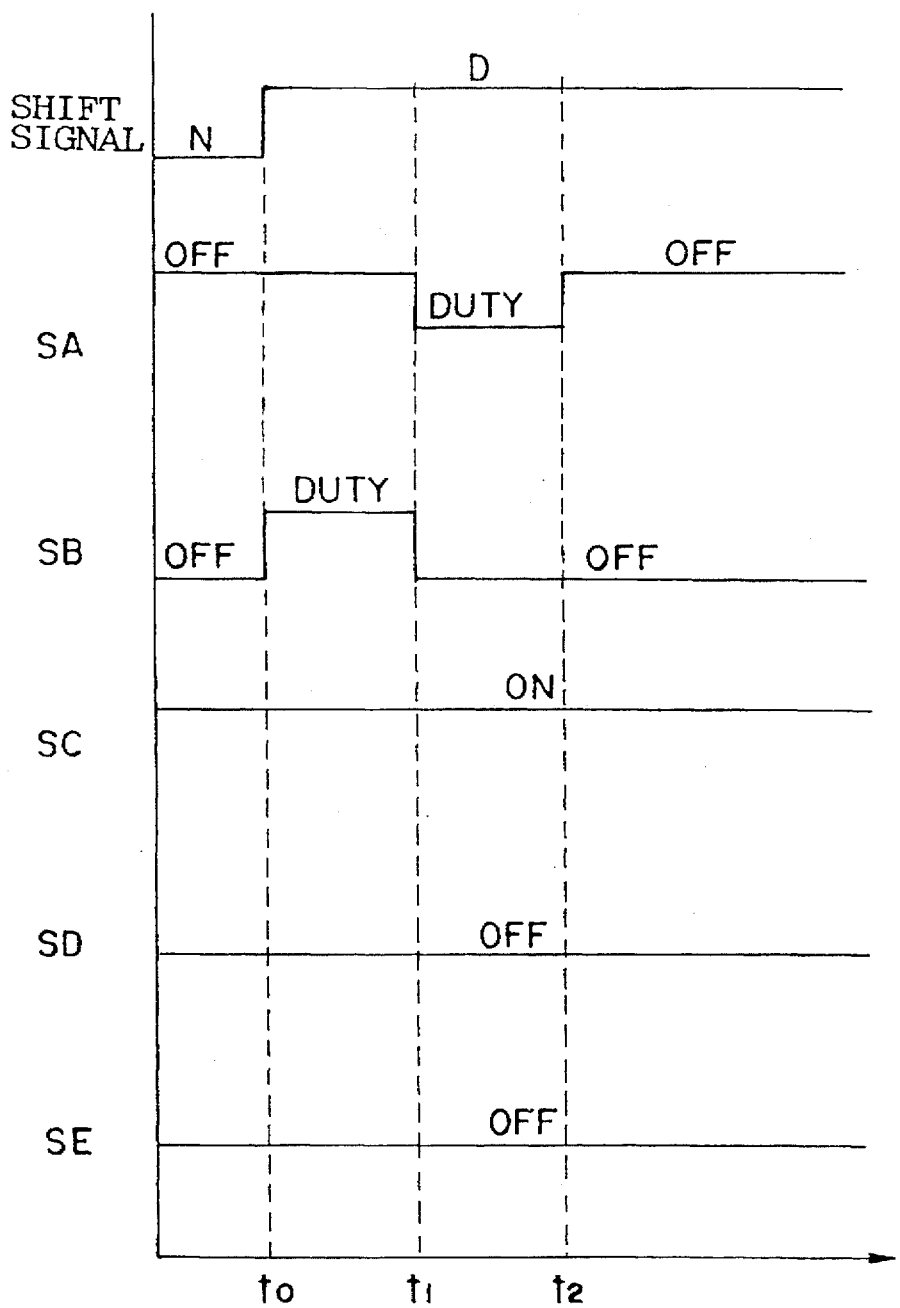
FIG. 9 is a graph showing a pattern of operational control of solenoid-operated valves in another gear shift control process effected by the gear shift control apparatus according to the present invention.
Figure 10:
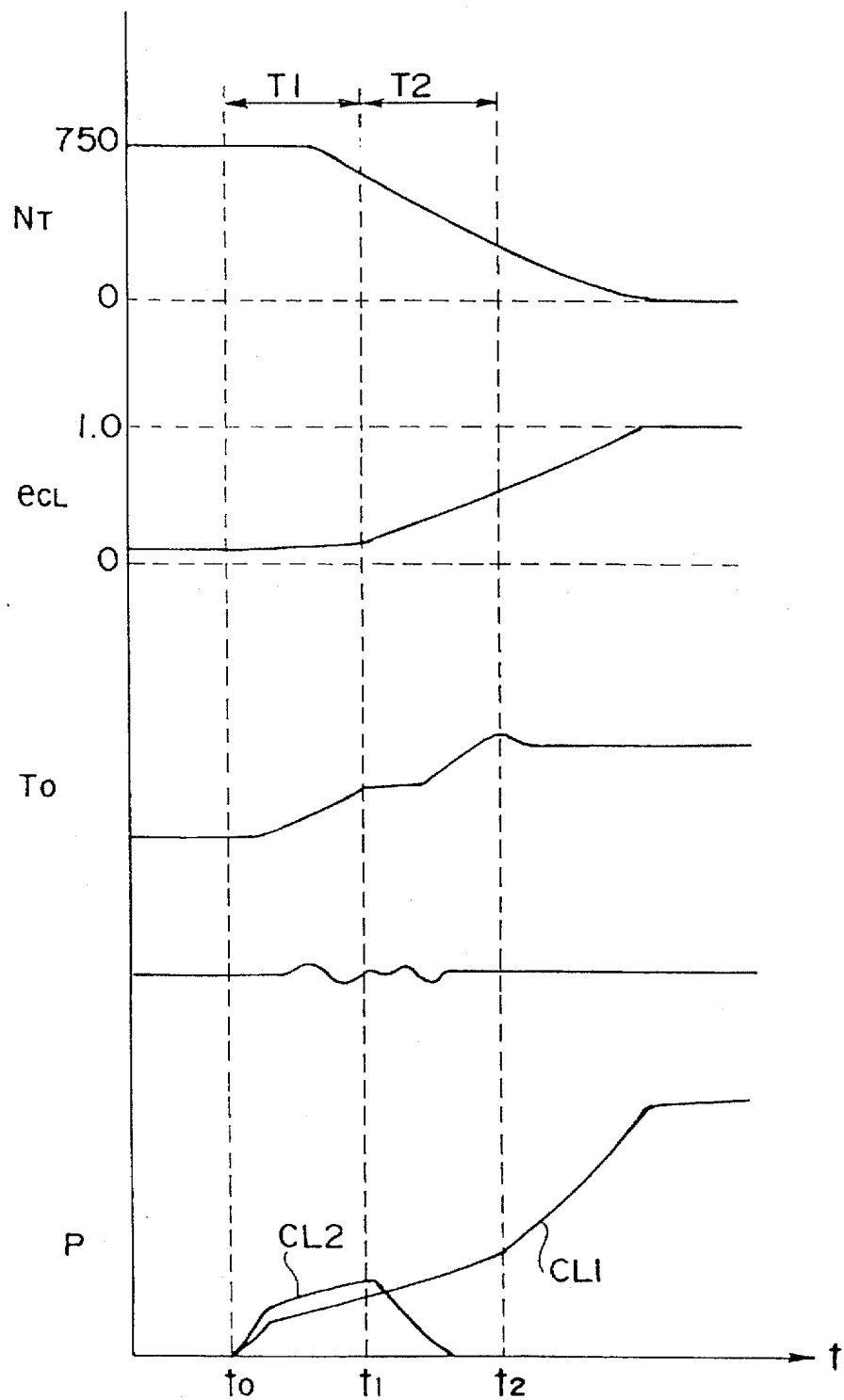
FIG. 10 is a graph showing how various variables vary with time in the other gear shift control process effected by the gear shift control apparatus according to the present invention.

A different mode of the gear engaging control will be described below with reference to FIGS. 9 and 10.

In this mode, a gear shift from the range N to the range D is effected while the throttle opening ΘTH is substantially fully closed and also while the vehicle speed V is substantially nil. When a command for such a gear shift is detected at a time t0, the solenoid of the solenoid-operated valve SA is turned off, and the duty cycle of the solenoid-operated valve SB is controlled. When the solenoid-operated valves SA, SB are thus controlled, the second clutch CL2 is supplied with a low clutch-engaging hydraulic pressure corresponding to the controlled duty cycle, and is partly engaged. Simultaneously, the first clutch CL1 starts being engaged.

When the second clutch CL2 and the first brake B1 start being engaged, a rotational speed NT of the transmission input shaft 3 starts being gradually lowered, and a input/output rotational speed ratio eCL starts being gradually increased. At the same time, a transmission output torque T0 starts being gradually increased, resulting in a slight change in an automobile acceleration G.

When the above control has continued for a first period of time T1 and a time t1 has been reached, the control system switches to controlling the duty cycle of the solenoid-operated valve SA, increasing the hydraulic pressure applied to the first clutch CL1. The solenoid of the solenoid-operated valve SB is turned off, releasing the second clutch CL2.

When the above control has continued for a third period of time T3 and a time t3 has been reached, the control system turns off the solenoid of the solenoid-operated valve SA. Since the solenoid-operated valve SA is of the normally-open type, the hydraulic pressure applied to the first clutch CL1 is increased to the line pressure at a given rate through the action of the accumulator 71 until the first clutch CL1 is fully engaged to establish the gear position 1ST.

In this mode of the gear engaging control, as described above, in an initial stage in which the first clutch CL1 starts being engaged to establish the gear position 1ST (starting gear position), the second clutch CL2 is partly engaged (preliminarily engaged). Because the second clutch CL2 is mechanically coupled to the one-way clutch B3, any vibrations produced upon rotation of the one-way clutch B3 are suppressed by the preliminarily engaged second clutch CL2 during the gear engaging control, therefore. Consequently, a highly smooth, vibration-free gear shift can be made from the range N to the range D during this mode of the gear engaging control.

Second Embodiment

Figure 11:
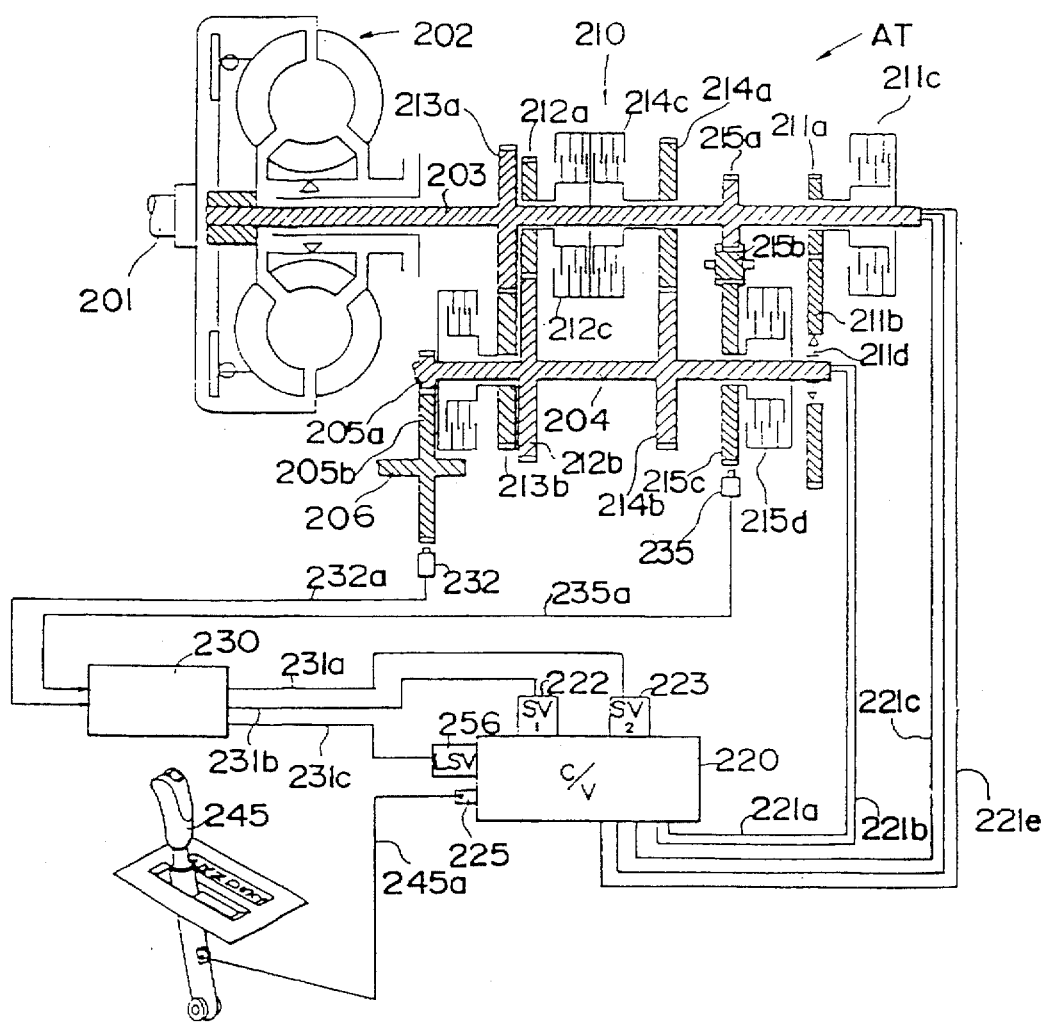
FIG. 11 is a schematic diagram of a countershaft-type automatic transmission which is controlled by a shift control apparatus as a second embodiment according to the present invention.

As a second embodiment, a countershaft-type automatic transmission is shown in FIG. 11 with a power transmission system which is controlled by a shift control apparatus of the present invention. In this automatic transmission AT, power is transmitted from an engine output shaft 201 to a torque converter 202 and then to a shift mechanism 210. The shift mechanism 210 has gear trains for establishing a plurality of power transmission paths through which the rotation of an output shaft 206 is variably controlled. More specifically, power is first transmitted from the torque converter 202 to an input shaft 203. It is then transmitted to a counter shaft 204, which extends parallel to the input shaft 203, with a rotational change through one of the five gear trains juxtaposed with respect to one another between the input shaft 203 and the countershaft 204. From the countershaft 204, it is then transmitted to the output shaft 206 through an output gear train 205a and 205b.

These five gear trains comprises a first range gear train 211a and 211b, a second range gear train 212a and 212b, a third range gear train 213a and 213b, a fourth range gear train 214a and 214b, and a reverse range gear train 215a, 215b and 215c. Each gear train is provided with a hydraulic clutch 211c, 212c, 213c, 214c, or 215d, which allows power transmission through a respective gear train. Moreover, a first range gear 211b on the countershaft 204 is provided with one-way clutch 211d. As such, when one of these clutches is selectively actuated, a respective gear train is selected for power transmission with a speed-range shift.

These five clutches 211c~215d are controlled by a hydraulic pressure supplied from a control valve unit 220 through lines 221a~221e.

This control valve unit 220 comprises a manual valve 225, two solenoid valves 222 and 223, and a linear solenoid valve 256. The manual valve 225 is connected through a cable 245a to a shift lever 245, which is operated by a driver.

The solenoid valves 222 and 223 are turned on or off by signals sent from a controller 230 through signal lines 231a and 231b. The linear solenoid valve 256 is also controlled by a signal sent from the controller 230 through a signal line 231c. A first rotation sensor 235, which detects the input rotational speed of the clutches from the rotation of a reverse gear 215c, sends a rotation signal to the controller 230 through a signal line 235a. A second rotation sensor 232, which detects the output rotational speed of the clutches from an output gear 205b, sends a rotation signal to the controller 230 through a signal line 232a.

Shift control of the transmission is described hereafter.

A shift control is carried out in response to a speed range set by the manual valve 225 in the control valve unit 220 when the shift lever 245 is operated. There are six ranges: P, R, N, D, S, and 2, for example. In the P and N ranges, all the clutches 211c~215d are not engaged, so the transmission is in a neutral condition. In the R range, the reverse clutch 215d is engaged to set the reverse range. In the D, S, and 2 ranges, shift controls are carried out in accord with a shift map.

Figure 12:
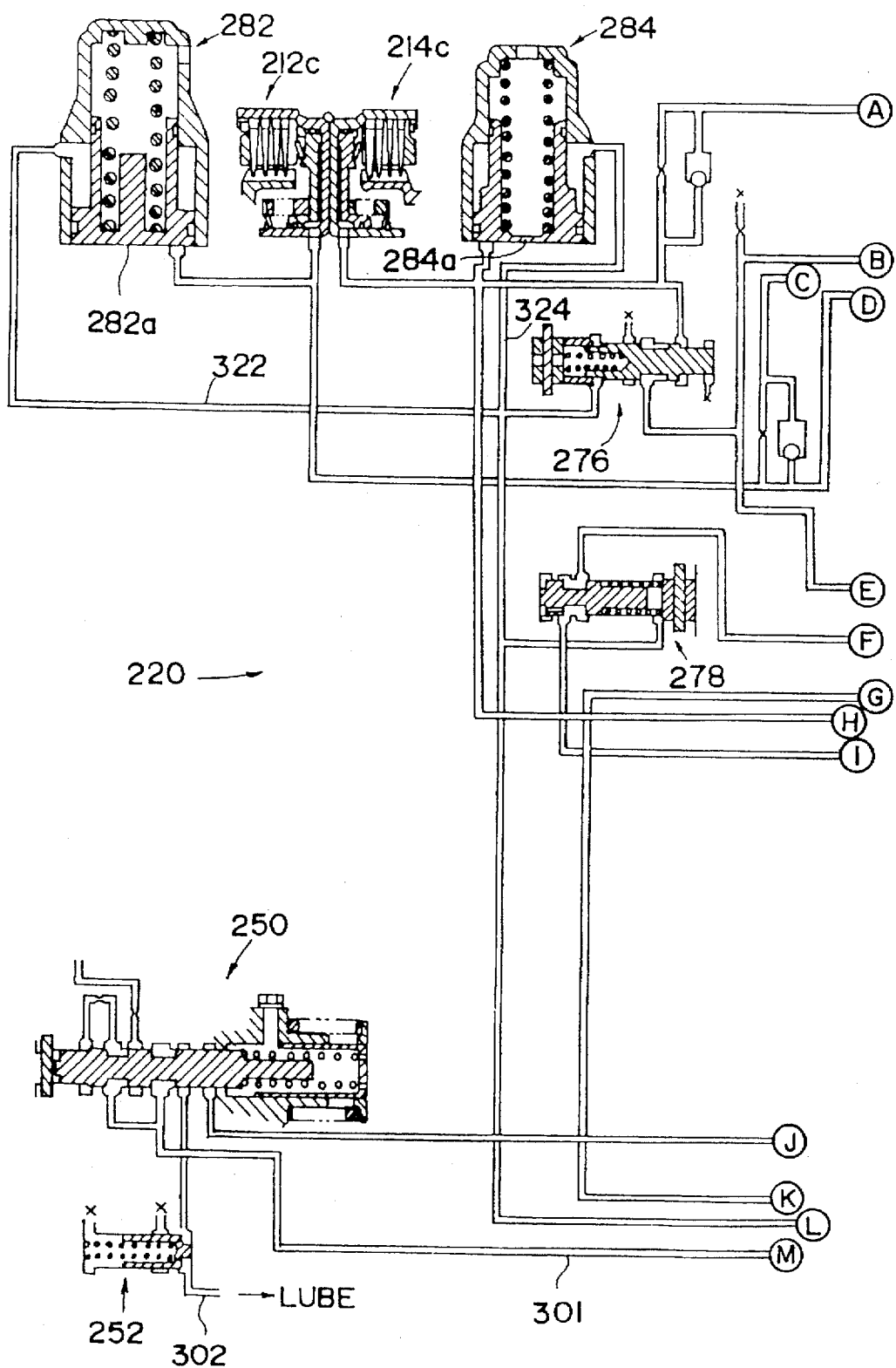
FIG. 12 is a partial hydraulic circuit diagram of the shift control apparatus.
Figure 13:
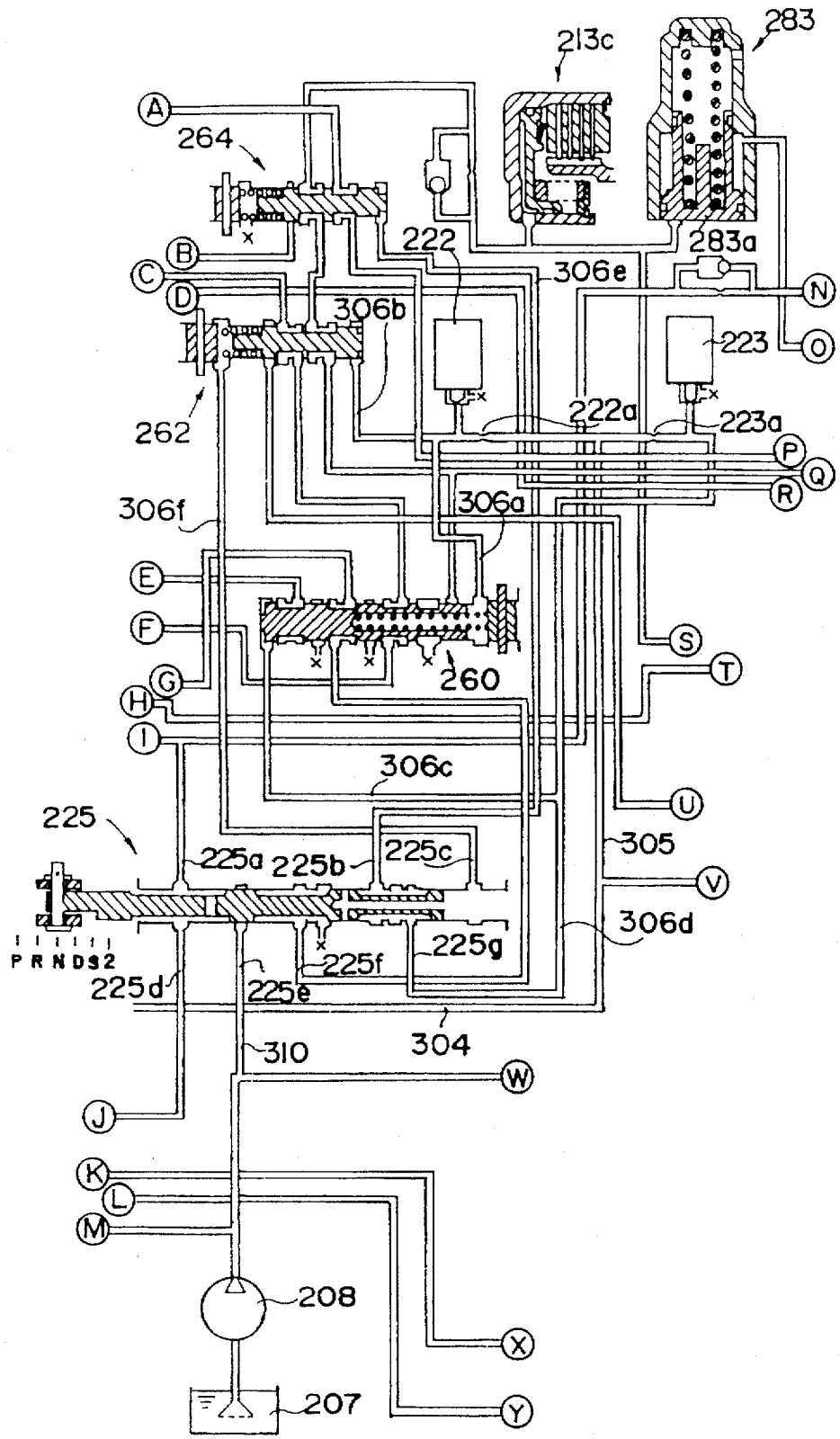
FIG. 13 is a partial hydraulic circuit diagram of the shift control apparatus.
Figure 14:
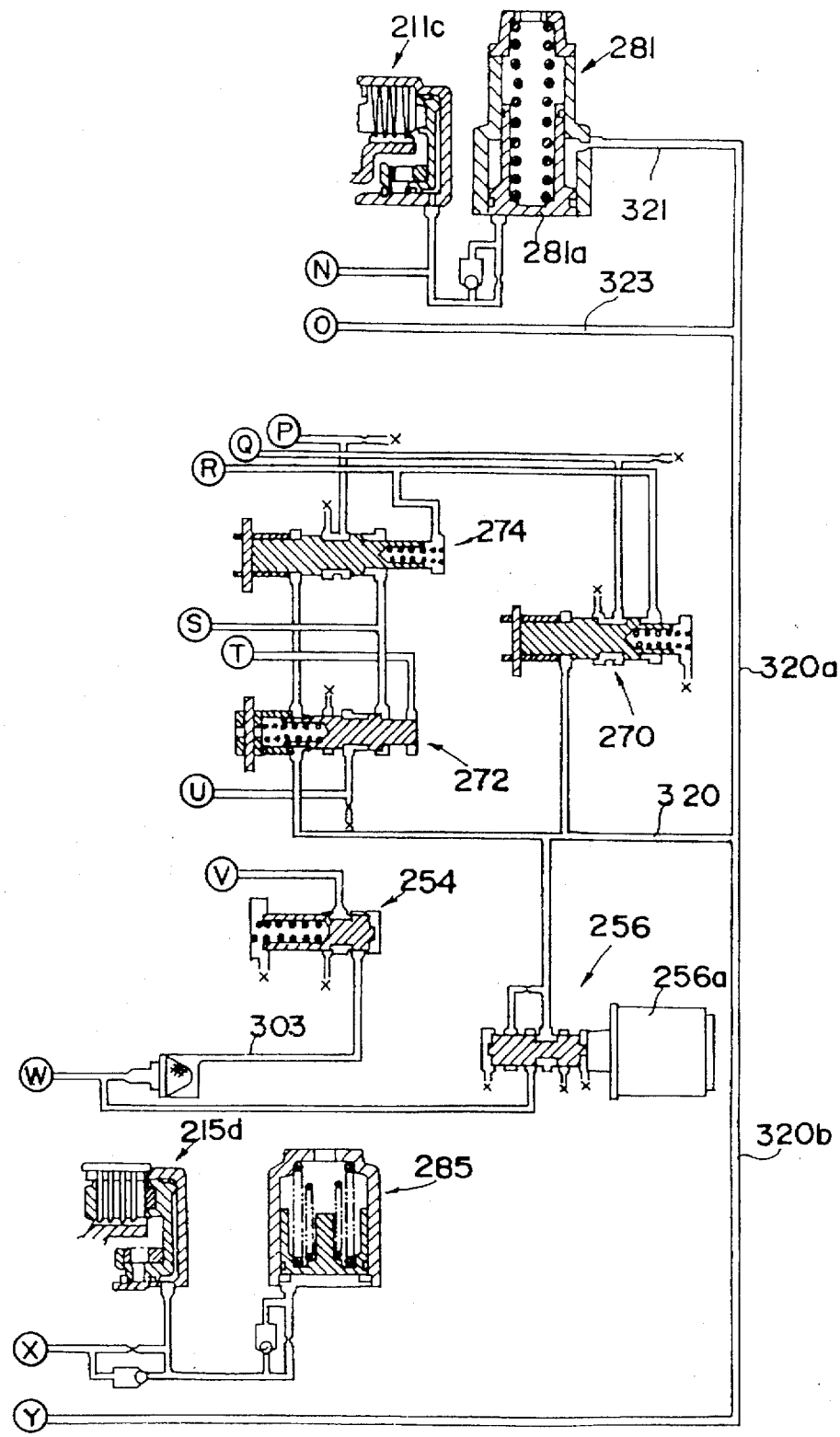
FIG. 14 is a partial hydraulic circuit diagram of the shift control apparatus.

The above control valve unit 220 is described with reference to FIGS. 12, 13, and 14. These figures together show a unified hydraulic circuit, so the respective circuit portions illustrated separately are connected at terminals marked with the same encircled letters of the alphabet.

In the control valve unit 220, oil is supplied from a tank 207 by a pump 208 to a regulator valve 250 through a line 301. The regulator valve 250 adjusts the oil to have a predetermined line pressure, which is supplied to the manual valve 225 through a line 310. The manual valve 225 together with other valves of the control valve unit 220 controls the supply of the line pressure to the clutches 211c, 212c, 213c, 214c, and 215d for the purpose of selectively actuating the respective clutches in response to the vehicle's driving condition.

Now, various valves of the control valve unit 220 are described. A check valve 252 is provided down-stream to the regulator valve 250. It prevents the pressure of lubricating oil, which is supplied through a line 302 to where lubrication is needed in the transmission, from rising above a predetermined value. A modulator valve 254 reduces the line pressure supplied through a line 303 to produce a modulating pressure. This modulating pressure is supplied through a line 304 to a lockup-clutch control circuit (not shown) for controlling the lockup clutch of the torque converter 202. It is also supplied to the first and second solenoid valves 222 and 223 through a line 305 for controlling shift valves.

The manual valve 225 is shifted in correspondence with the shift lever 245 operated by the driver, and it is positioned at one of the positions: P, R, N, D, S, and 2. The line pressure supplied from a line 310 is selectively supplied to lines 225a~225g in correspondence with the position of the manual valve 225.

When the manual valve 225 is positioned at the D, S, or 2; a 1–2 shift valve 260, a 2–3 shift valve 262, and a 3–4 shift valve 264 are controlled by the modulating pressure, which is supplied through lines 306a~306f as the first and second solenoid valves 222 and 223 are turned on or off. These shift valves control the supply of the line pressure to the clutches 211c, 212c, 213c, and 214c for the purpose of establishing the first through fourth ranges.

The lines 306a and 306b are connected to the first solenoid valve 222 and with the line 305 through an orifice 222a. Therefore, when the first solenoid valve 222 is turned off, the drain port thereof is closed, so the lines 306a and 306b are supplied with the modulating pressure from the line 305. When the first solenoid valve 222 is turned on, the drain port opens, so the pressure in the lines 306a and 306b becomes almost nil. The lines 306c~306f are connected to the second solenoid valve 223 and with the line 305 through an orifice 223a. When the second solenoid valve 223 is turned off, the drain port thereof is closed, so the lines 306c~306f are supplied with the modulating pressure from the line 305. When the second solenoid valve 223 is turned on, the drain port opens, so the pressure in the lines 306c~306f becomes almost nil.

The line 306a is connected to the right end of the 1–2 shift valve 260, the line 306b to the right end of the 2–3 shift valve 262, the line 306c to the left end of the 1–2 shift valve 260, the line 306e to the right end of the 3–4 shift valve 264, and the line 306f to the left end of the 2–3 shift valve 262. The lines 306e and 306f are connected to the second solenoid valve 223 through the manual valve 225 and the line 306d. Therefore, when the energizing currents to the first and second solenoid valves 222 and 223 are controlled, the supply of the modulating pressure from the line 305 to the respective lines 306a~306f is controlled for the purpose of controlling the 1–2, 2–3 and 3–4 shift valves 260, 262 and 264. Thereby, the line pressure supplied from the line 310 through the manual valve 225 is selectively supplied to the clutches 211c, 212c, 213c and 214c for establishing a desired speed range.

The control valve unit 220 includes first fourth orifice control valves 270, 272, 274, and 276. These orifice control valves coordinate pressure release from the pressure chamber of an off-going clutch and pressure increase in the pressure chamber of an on-coming clutch during a speed-range shift. The first orifice control valve 270 controls the timing of pressure release from the third clutch when the transmission shifts from the third speed range to the second speed range. The second orifice control valve 272 controls the timing of pressure release from the second clutch when shifting from the second speed range to the third or fourth speed range. The third orifice control valve 274 controls the timing of pressure release from the fourth clutch when shifting from the fourth speed range to the third or second speed range. The fourth orifice control valve 276 controls the timing of pressure release from the third clutch when shifting from the third speed range to the fourth speed range.

Furthermore, the clutches 211c, 212c, 213c, and 214c are provided with respective accumulators 281, 282, 283, and 284, whose pressure-receiving chambers are connected with the pressure chambers of the clutches. The back-pressure chambers which are provided opposite the pressure-receiving chambers through piston members 281a, 282a, 283a, and 284a are connected to lines 321, 322, 323, and 324. These lines connect to the linear solenoid valve 256 through lines 320a, 320b, and 320.

The linear solenoid valve 256 has a linear solenoid 256a, whose energizing current is controlled so as to control the actuation force of the linear solenoid valve 256 for the purpose of controlling the pressure supplied to the line 320. In other words, control of the energizing current to the linear solenoid 256a enables control of the pressure in each of the back-pressure chambers of the accumulators 281~284, thereby enabling control of the pressure in the pressure-chamber of an engaging clutch (off-going clutch).

Automatic shifts are carried out by the line pressure, which is selectively supplied to the clutches 211c, 212c, 213c, and 214c in accordance with the turning on or off of the solenoid valves 222 and 223 and in correspondence with the position of the manual valve 225, which is operated with the shift lever 245, with appropriate coordination of the above described valves in the control valve unit 220.

Table 3 shows relation between the speed ranges and the ON or OFF of the first solenoid valve 222 (SV1) and second solenoid valve 223 (SV2) when the shift lever 245 is set at the D position.

TABLE 3

|     | SV1 (222) | SV2 (223) |
| --- | --- | --- |
| 1ST | OFF | ON |
| 2ND | ON | ON |
| 3RD | ON | OFF |
| 4TH | OFF | OFF |

Figure 15:
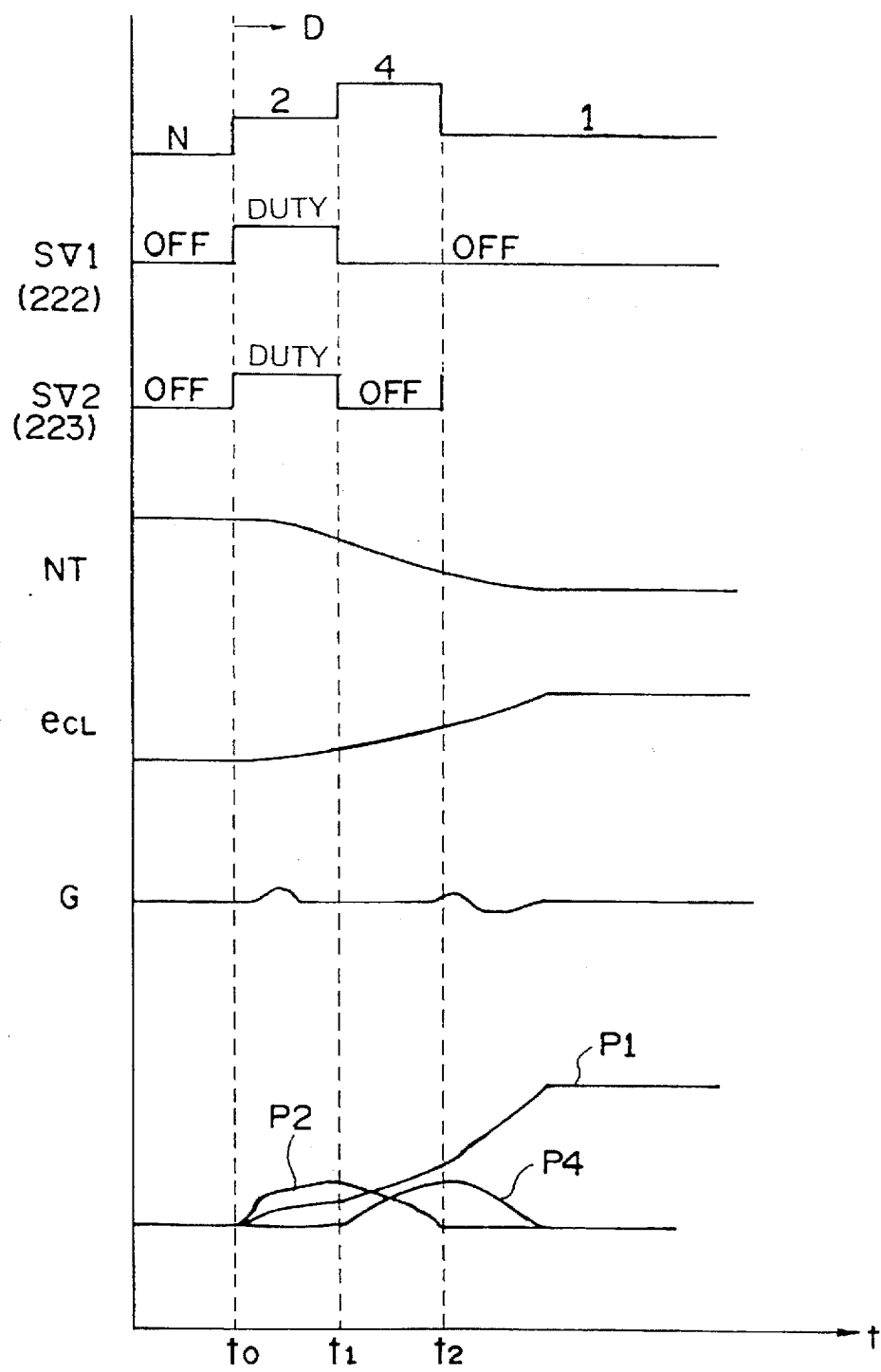
FIG. 15 is a timing chart showing a pattern of operational control of solenoid valves actuated by the shift control apparatus.

Now, a control procedure for shifting the automatic transmission from the N range (neutral range) to the D range (forward range), which takes place when the shift lever is operated from the N position to the D position, is described with reference to FIGS. 15 and 16. As shown in the timing chart of FIG. 15, the shift lever is operated from the N position to the D position at time t0.

Figure 16:
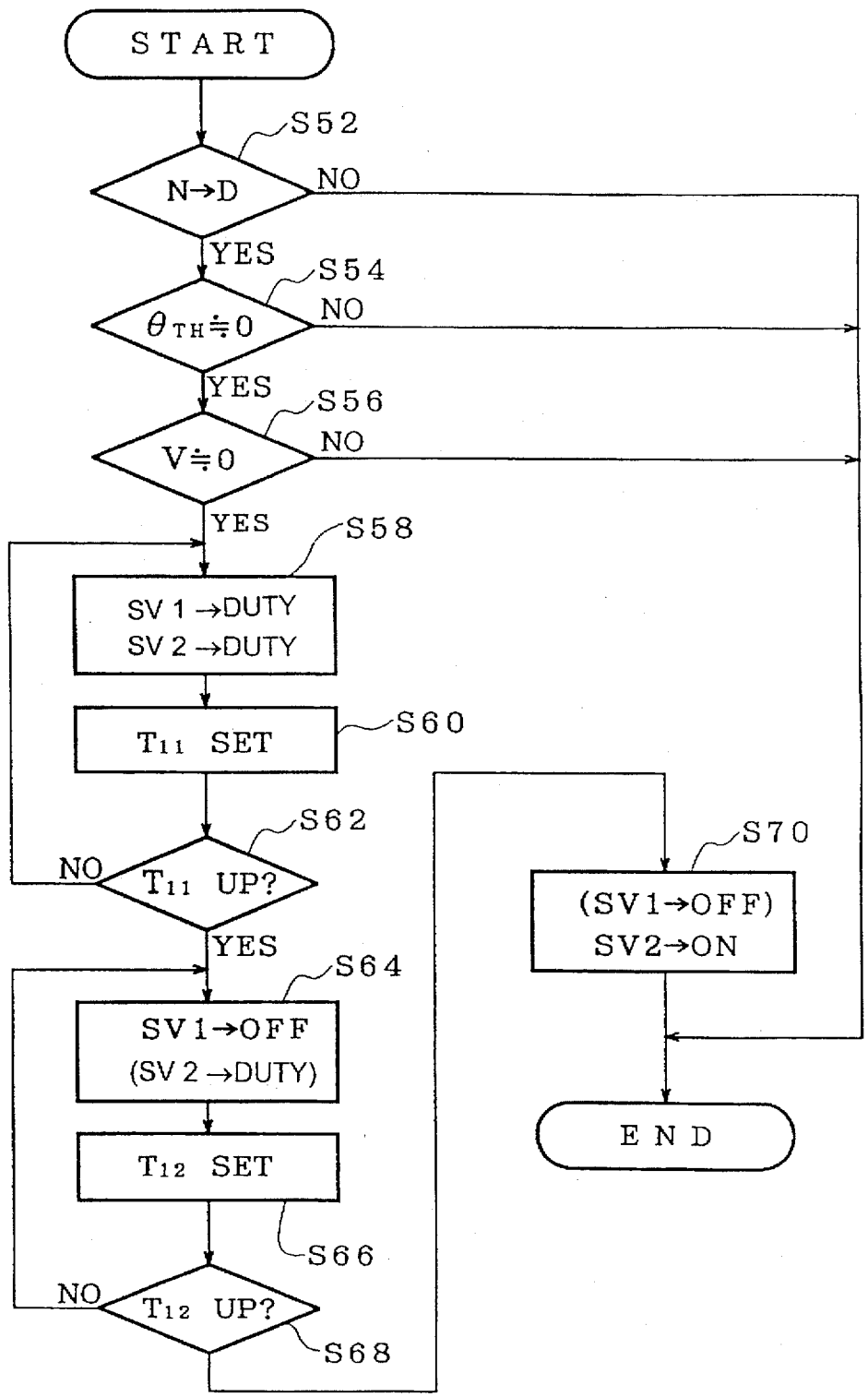
FIG. 16 is a flowchart showing a series of shift control processes effected by the shift control apparatus.

As shown in the flow chart of FIG. 16, the control system tries to detect a shift at step S52. If the shift from the N range to the D range is detected at time t0, then determinations are made whether the throttle opening $\Theta TH$ is substantially closed or not and whether the vehicle speed V is substantially nil or not at steps S54 and S56. Even if the throttle opening $\Theta TH$ is substantially closed, if the vehicle speed V is not substantially nil, then no shift process is carried out.

If the switch from the N range to the D range is effected while the throttle opening $\Theta TH$ is substantially closed and the vehicle speed V is substantially nil, then the shift control proceeds to step S58, where the first and second solenoid valves SV1 and SV2 are actuated at duty cycles. The solenoid valves are controlled at duty cycles for a first predetermined time period T11 at steps S60 and S62. Because the solenoid valves are being controlled as such, the second clutch 212c engages loosely (preliminary engagement).

After the initiation of partial engagement in the second clutch 212c, the input rotational speed NT of the transmission (i.e., the rotational speed of the turbine of the torque converter) starts decreasing gradually, so the input/output rotational speed ratio eCL starts increasing gradually. At the same time, the transmission output torque T0 also starts increasing gradually, so the vehicle acceleration G changes slightly. By the way, in the N range, the engine was idling at a rotational speed of, e.g., about 850 rpm, and the input rotational speed NT of the transmission was, e.g., about 750 rpm because the engine output is transmitted through the torque converter to the transmission.

After the above control process has been carried out for the first predetermined time period T11, time t1 is reached, and the first solenoid valve SV1 is turned off at step S64. However, the second solenoid valve SV2 is kept controlled at a duty cycle. As a result, the second clutch 212c is released, and instead, the fourth clutch 214c engages loosely. This partial engagement of the the fourth clutch continues for a second predetermined time period T12 at steps S66 and S68. Then, while the first solenoid valve SV1 is kept turned off, the second solenoid valve SV2 is fully turned on at step 70.

In the above control, the first clutch 211c starts receiving the actuation pressure right after a command to shift from the N range to the D range is received. However, the system requires that the second clutch be supplied with the pressure during the first predetermined time period T11 and the fourth clutch be supplied with the pressure during the second predetermined time period T12. Thereby, the engagement of the first clutch becomes moderated for the purpose of avoiding a shift shock.

Furthermore, the partial engagement (preliminary engagement) of the second and fourth clutches restricts vibration of the one-way clutch, thereby enabling a smooth, vibration-free gear shift.

In the above control procedure, the actuation control of the solenoid valves is timed (time points t1 and t2) by a timer which is set with predetermined time periods. However, instead of using this timer, the actuation of the solenoid valves may be controlled in response to changes of the input/output rotational speed ratio eCL.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for controlling a gear shift in an automatic transmission having an input shaft, an output shaft disposed parallel to the input shaft, a plurality of power transmitting gear trains juxtaposed between the input shaft and the output shaft and making up a combination of forward power transmitting paths that can be selected one at a time, a plurality of frictional engaging elements for selecting one of the forward power transmitting paths at a time, and a one-way clutch for establishing a starting gear position among the forward power transmitting paths, the frictional engaging elements being controllable for engagement and disengagement to establish at least a forward gear range composed of forward gear positions and a neutral gear range for cutting off power transmission between the input shaft and the output shaft, said apparatus comprising:

gear engaging control detecting means for detecting a gear shift to be made from the neutral gear range to the forward gear range; and gear shift control means responsive to an output signal from said gear engaging control detecting means, for preliminarily engaging one of the frictional engaging elements which mechanically connects to the one-way clutch and is not used for establishing the starting range, thereafter starting engaging one of the frictional engaging elements which is necessary to establish the starting gear position, then releasing said at least one of the frictional engaging elements which was preliminarily and partially engaged but not use for establishing the starting gear position when an actual shift from the neutral gear range to the forward gear range is judged to be ready.

2. An apparatus according to claim 1, wherein said forward power transmitting paths include the starting gear position as a first gear position, a second gear position, a third gear position, and a fourth gear position, and said frictional engaging elements include a clutch for the first gear position, a clutch for the second gear position, a clutch for the third gear position, and a clutch for the fourth gear position, and wherein said gear shift control means comprises means responsive to the output signal from said gear engaging control detecting means, for preliminarily engaging the clutch for the second gear position, then preliminarily engaging the clutch for the fourth gear position and concurrently preliminarily engaging the clutch for the first gear position.

3. An apparatus for controlling a gear shift in an automatic transmission having an input member, an output member, a plurality of power transmitting gear trains disposed between the input member and the output member and making up a plurality of forward ranges, including a starting range, that can be selected one at a time, a plurality of frictional engaging elements for selecting one of the forward ranges at a time, and a one-way clutch used for establishing the starting range, the frictional engaging elements being controllable for engagement and disengagement to establish one of the forward ranges and a neutral range, said apparatus comprising:

gear engaging control detecting means for detecting a gear shift to be made from the neutral gear range to the starting range; and gear shift control means responsive to an output signal from said gear engaging control detecting means for preliminarily and partially engaging at least one of the frictional engaging elements which mechanically connects to the one-way clutch and is not used for establishing the starting range, thereafter starting engaging one of the frictional engaging elements for establishing the starting range, and then releasing said at least one of the frictional engaging elements which was preliminarily and partially engaged but not used for establishing the starting range when an actual shift from the neutral range to the starting range is judged to be ready.

4. An apparatus according to claim 3, wherein said gear shift control means conducts said engaging control of the frictional engaging elements when a throttle opening of an engine associated with the automatic transmission is substantially closed and a speed at which a motor vehicle with the automatic transmission mounted thereon travels is substantially nil.

5. An apparatus according to claim 3, wherein said gear shift control means comprises means for determining that the actual shift from the neutral range to the starting range is ready upon elapse of a first predetermined period of time after the output signal is issued from said gear engaging control detecting means, said first predetermined period of time being appropriately set based on previous measurements.

6. An apparatus according to claim 3, wherein said gear shift control means comprises means for determining that the actual shift from the neutral range to the starting range is ready when an input/output rotational speed ratio in said one of the frictional engaging elements for establishing the starting range reaches a first predetermined ratio after the output signal is issued from said gear engaging control detecting means, said first predetermined ratio being appropriately set based on previous measurements.

7. An apparatus according to any one of claims 3 through 6 wherein said gear shift control means comprises means for preliminarily engaging, for a preselected period of time, another one of the frictional engaging elements which can be used to establish the starting range when engine braking is needed, wherein said preselected period starts at the same time as said starting of engaging of said frictional element for establishing the starting range and ends when said frictional element for establishing the starting range is substantially engaged.

8. An apparatus for controlling a gear shift in an automatic transmission having an input member, an output member, a plurality of power transmitting planetary gear trains disposed between the input member and the output member and making up a plurality of forward power ranges, including a starting range, that can be selected one at a time, and a plurality of frictional engaging elements for selecting one of the forward ranges at a time, the frictional engaging elements being controllable for engagement and disengagement to establish one of the forward ranges and a neutral range, said apparatus comprising:

gear engaging control detecting means for detecting a gear shift to be made from the neutral gear range to the starting range; and gear shift control means responsive to an output signal from said gear engaging control detecting means for preliminarily and partially engaging at least one of the frictional engaging elements which is mechanically coupled to at least one carrier of said planetary gear trains and is not used for establishing the starting range, and thereafter starting engaging one of the frictional engaging elements for establishing the starting ranged and then releasing said at least one of the frictional engaging elements which was preliminarily and partially engaged but not used for establishing the starting range when an actual shift from the neutral range to the starting range is judged to be ready.

9. An apparatus according to claim 8, further comprising a one-way clutch for establishing the starting range, said gear shift control means including means for preliminarily and partially engaging one of the frictional engaging elements which mechanically connects to said one-way clutch and is not used for establishing the starting range, when an actual shift from the neutral range to the starting range is judged to be ready.

10. An apparatus according to claim 8, wherein said gear shift control means includes means for preliminarily and partially engaging, for a predetermined period of time, one of said frictional engaging elements which is used to establish the starting gear position and which is disposed parallel to said one-way clutch for applying engine braking, and thereafter releasing said one of the frictional engaging elements.

11. An apparatus according to any one of claims 8 through 10, wherein said gear shift control means engage and release said frictional engaging elements at times which are determined by a timer.

12. An apparatus according to any one of claims 8 through 10, wherein said gear shift control means engage and release said frictional engaging elements at times which are determined based on an input/output rotational speed ratio in one of the frictional engaging elements for establishing the starting gear position.

13. An apparatus according to any one of claims 8 through 10, wherein said gear shift control means engage and release said frictional engaging elements at times which are determined based on a rotational speed of the input member.

14. An apparatus according to any one of claims 8 through 10, wherein said gear shift control means comprises means for determining that the actual shift from the neutral range to the starting range is ready upon elapse of a first predetermined period of time after the output signal is issued from said gear engaging control detecting means, said first predetermined period of time being appropriately set based on previous measurements.

15. An apparatus according to any one of claims 8 through 10, wherein said gear shift control means comprises means for determining that the actual shift from the neutral range to the starting range is ready when an input/output rotational speed ratio in said one of the frictional engaging elements for establishing the starting range reaches a first predetermined ratio after the output signal is issued from said gear engaging control detecting means, said first predetermined ratio being appropriately set based on previous measurements.

16. An apparatus for controlling a gear shift in an automatic transmission having an input member, a plurality of power transmitting gear trains disposed between the input member and the output member and making up a plurality of forward ranges, including a starting range, that can be selected one at a time, a plurality of frictional engaging elements for selecting one of the forward ranges at a time, and a one-way clutch used for establishing the starting range, the frictional engaging elements being controllable for engagement and disengagement to establish one of the forward ranges and a neutral range, said apparatus comprising:

gear engaging control detecting means for detecting a gear shift to be made from the neutral gear range to the starting range; and gear shift control means responsive to an output signal from said gear engaging control detecting means, for preliminarily and partially engaging at least one of the frictional engaging elements which mechanically connects to the one-way clutch and is not used for establishing the starting range, simultaneously starting engaging one of the frictional engaging elements for establishing the starting range, and after an elapse for a predetermined period of time, releasing said at least one of the frictional engaging elements which was preliminarily and partially engaged but not used for establishing the starting range.

17. An apparatus according to claim 16, wherein said gear shift control means engage and release said frictional engaging elements at times which are determined by a timer.

18. An apparatus according to claim 16, wherein said gear shift control means engage and release said frictional engaging elements at times which are determined based on an input/output rotational speed ratio in one of the frictional engaging elements for establishing the starting gear position.

19. An apparatus according to claim 16, wherein said gear shift control means engage and release said frictional engaging elements at times which are determined based on a rotational speed of the input member.

20. An apparatus according to claim 16, wherein said gear shift control means comprises means for determining that the actual shift from the neutral range to the starting range is ready upon elapse of a first predetermined period of time after the output signal is issued from said gear engaging control detecting means, said first predetermined period of time being appropriately set based on previous measurements.

21. An apparatus according to claim 16, wherein said gear shift control means comprises means for determining that the actual shift from the neutral range to the starting range is ready when an input/output rotational speed ratio in said one of the frictional engaging elements for establishing the starting range reaches a first predetermined ratio after the output signal is issued from said gear engaging control detecting means, said first predetermined ratio being appropriately set based on previous measurements.

* * * * *

UNITED STATES PATENT AND TRADEMARK OFFICE
CERTIFICATE OF CORRECTION

PATENT NO. : 5,749,805

DATED : 5/12/98

INVENTOR(S) : T. Shimada et al.

It is certified that error appears in the above-identified patent and that said Letters Patent is hereby corrected as shown below:

Column 16, line 45, "use" should read --used--.

Signed and Sealed this

Ninth Day of February, 1999

Attest:

Attesting Officer

Acting Commissioner of Patents and Trademarks